US012682805B2

(12) United States Patent
Chung et al.

(10) Patent No.: US 12,682,805 B2
(45) Date of Patent: Jul. 14, 2026

(54) DISPLAY DEVICE AND MULTIPLEXING DRIVING METHOD THEREOF

(71) Applicant: Samsung Electronics Co., Ltd., Suwon-si (KR)

(72) Inventors: Sooyoon Chung, Suwon-si (KR); Jong-Hee Na, Suwon-si (KR); Byoungyoon Jang, Suwon-si (KR); Se Whan Na, Suwon-si (KR); Hyeonsu Park, Suwon-si (KR); Hyunwook Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/949,219

(22) Filed: Nov. 15, 2024

(65) Prior Publication Data

US 2025/0363930 A1 Nov. 27, 2025

(30) Foreign Application Priority Data

May 24, 2024 (KR) ........................ 10-2024-0067944

(51) Int. Cl.
*G09G 3/20* (2006.01)
*G09G 3/3225* (2016.01)
(Continued)

(52) U.S. Cl.
CPC ......... *G09G 3/2007* (2013.01); *G09G 3/3225* (2013.01); *G09G 3/3275* (2013.01);
(Continued)

(58) Field of Classification Search
CPC .. G09G 3/2007; G09G 3/3225; G09G 3/3275; G09G 3/3291; G09G 3/3648;
(Continued)

(56) References Cited

U.S. PATENT DOCUMENTS 8,059,140 B2 * 11/2011 Kwon .................. G09G 3/2011 345/691
8,421,733 B2 * 4/2013 Lee .......................... G09G 3/36 345/99

(Continued)

FOREIGN PATENT DOCUMENTS

| | | | |
|---|---|---|---|
| KR | 102350392 | B1 | 1/2022 |
| KR | 102421475 | B1 | 7/2022 |
| KR | 102552948 | B1 | 7/2023 |

*Primary Examiner* — Michael J Jansen, II
(74) *Attorney, Agent, or Firm* — Fish & Richardson P.C.

(57) ABSTRACT

A display device includes a plurality of gate lines and data lines, a plurality of first pixels, each connected to a first data line and the gate lines, a plurality of second pixels, each connected to a second data line and the gate lines, a source driver to provide a first data signal to the first data line during a first time period and provide a second data signal to the second data line during a second time period, and a timing controller to generate first compensation grayscale data by compensating for a first original grayscale data corresponding to an input grayscale for each first pixel based on the input grayscale and a color of each first pixel, multiplex the first compensation grayscale data for each first pixel and a second original grayscale data for each second pixel, and provide the multiplexed data to the source driver.

20 Claims, 16 Drawing Sheets

(51) Int. Cl.
*G09G 3/3275* (2016.01)
*G09G 3/3291* (2016.01)
*G09G 3/36* (2006.01)

(52) U.S. Cl.
CPC ......... *G09G 3/3291* (2013.01); *G09G 3/3648* (2013.01); *G09G 3/3688* (2013.01); *G09G 2310/0297* (2013.01); *G09G 2310/06* (2013.01); *G09G 2310/08* (2013.01); *G09G 2320/0233* (2013.01); *G09G 2320/0242* (2013.01); *G09G 2320/0686* (2013.01)

(58) Field of Classification Search
CPC ......... G09G 3/3688; G09G 2310/0297; G09G 2310/06; G09G 2310/08; G09G 2320/0233; G09G 2320/0242; G09G 2320/0686
See application file for complete search history.

(56) References Cited

U.S. PATENT DOCUMENTS

| | | | | |
|---|---|---|---|---|
| 8,692,854 | B2 * | 4/2014 | Huang | H04N 9/73 382/167 |
| 9,318,036 | B2 * | 4/2016 | Park | G09G 3/20 |
| 9,792,856 | B2 * | 10/2017 | Park | G09G 3/3233 |
| 9,799,285 | B2 | 10/2017 | Jang et al. | |
| 9,870,749 | B2 * | 1/2018 | Yoo | G09G 3/3688 |
| 10,096,304 | B2 * | 10/2018 | Kim | G09G 5/395 |
| 10,121,425 | B2 | 11/2018 | Ahn et al. | |
| 10,242,634 | B2 | 3/2019 | Sang et al. | |
| 10,803,807 | B2 | 10/2020 | Lee et al. | |
| 10,867,560 | B2 * | 12/2020 | Yoon | H10K 59/352 |
| 11,069,312 | B2 | 7/2021 | Watanabe | |
| 11,551,601 | B2 * | 1/2023 | Ahn | G09G 3/2007 |
| 11,645,964 | B2 | 5/2023 | Jang | |
| 11,769,436 | B2 | 9/2023 | Kim et al. | |
| 12,444,372 | B2 * | 10/2025 | Kim | G09G 3/3291 |
| 12,531,020 | B2 * | 1/2026 | Kim | G09G 3/3233 |
| 2006/0267893 | A1 * | 11/2006 | Kim | G09G 3/3611 345/89 |
| 2007/0234152 | A1 * | 10/2007 | Kwon | G09G 3/3233 714/726 |
| 2010/0007597 | A1 * | 1/2010 | Lee | G09G 3/36 345/99 |
| 2011/0227941 | A1 * | 9/2011 | Huang | H04N 9/73 345/596 |
| 2014/0104265 | A1 * | 4/2014 | Park | G09G 3/3648 345/214 |
| 2016/0078826 | A1 * | 3/2016 | Yoo | G09G 3/3648 345/88 |
| 2016/0098956 | A1 * | 4/2016 | Park | G09G 3/3233 345/77 |
| 2016/0217724 | A1 * | 7/2016 | Kim | G09G 5/395 |
| 2019/0164502 | A1 * | 5/2019 | Yoon | H10K 59/353 |
| 2021/0398473 | A1 * | 12/2021 | Ahn | G09G 5/10 |
| 2023/0129090 | A1 * | 4/2023 | Kim | G09G 3/3233 345/690 |
| 2023/0282174 | A1 * | 9/2023 | Kim | G09G 3/3291 |
| 2025/0363930 | A1 * | 11/2025 | Chung | G09G 3/2007 |

* cited by examiner

FIG. 11(a)

GSD

| | | | |
|---|---|---|---|
| 128 | 128 | 128 | 128 |
| 128 | 128 | 128 | 128 |
| 128 | 128 | 128 | 128 |
| 128 | 128 | 128 | 128 |

FIG. 11(b)

GCF

| | | | |
|---|---|---|---|
| 2 | 5 | 1 | 5 |
| 1 | 5 | 2 | 5 |
| 2 | 5 | 1 | 5 |
| 1 | 5 | 2 | 5 |

FIG. 11(c)

FGD

| | | | |
|---|---|---|---|
| 130 | 133 | 128 | 128 |
| 129 | 133 | 128 | 128 |
| 130 | 133 | 128 | 128 |
| 129 | 133 | 128 | 128 |

FIG. 12(a)

GSD

| | | | |
|---|---|---|---|
| 128 | 128 | 128 | 128 |
| 128 | 128 | 128 | 128 |
| 128 | 128 | 128 | 128 |
| 128 | 128 | 128 | 128 |

FIG. 12(b)

GCF

| | | | |
|---|---|---|---|
| 2 | 5 | | |
| 1 | 5 | | |
| 2 | 5 | | |
| 1 | 5 | | |

FIG. 12(c)

FGD

| | | | |
|---|---|---|---|
| 130 | 133 | 128 | 128 |
| 129 | 133 | 128 | 128 |
| 130 | 133 | 128 | 133 |
| 129 | 133 | 130 | 133 |

FIG. 14(a)

GSD

| | | | | | | | |
|---|---|---|---|---|---|---|---|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

FIG. 14(b)

GCF

| | | | | | | | |
|---|---|---|---|---|---|---|---|
| 2 | 5 | 1 | 5 | 2 | 5 | 1 | 5 |
| 1 | 5 | 2 | 5 | 1 | 5 | 2 | 5 |
| 2 | 5 | 1 | 5 | 2 | 5 | 1 | 5 |
| 1 | 5 | 2 | 5 | 1 | 5 | 2 | 5 |

FIG. 14(c)

FGD

| | | | | | | | |
|---|---|---|---|---|---|---|---|
| 130 | 133 | 129 | 133 | 128 | 128 | 128 | 128 |
| 129 | 133 | 130 | 133 | 128 | 128 | 128 | 128 |
| 130 | 133 | 129 | 133 | 128 | 128 | 128 | 128 |
| 129 | 133 | 130 | 133 | 128 | 128 | 128 | 128 |

FIG. 15(a)

GSD

| | | | | | | | |
|---|---|---|---|---|---|---|---|
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |
| 128 | 128 | 128 | 128 | 128 | 128 | 128 | 128 |

FIG. 15(b)

GCF

| | | | | | | | |
|---|---|---|---|---|---|---|---|
| 2 | 5 | 1 | 5 | | | | |
| 1 | 5 | 2 | 5 | | | | |
| 2 | 5 | 1 | 5 | | | | |
| 1 | 5 | 2 | 5 | | | | |

FIG. 15(c)

FGD

| | | | | | | | |
|---|---|---|---|---|---|---|---|
| 130 | 133 | 129 | 133 | 128 | 128 | 128 | 128 |
| 129 | 133 | 130 | 133 | 128 | 128 | 128 | 128 |
| 130 | 133 | 129 | 133 | 128 | 128 | 128 | 128 |
| 129 | 133 | 130 | 133 | 128 | 128 | 128 | 128 |

DISPLAY DEVICE AND MULTIPLEXING DRIVING METHOD THEREOF

CROSS-REFERENCE TO RELATED APPLICATION

This application claims priority to and the benefit of Korean Patent Application No. 10-2024-0067944 filed at the Korean Intellectual Property Office on May 24, 2024, the entire contents of which are incorporated herein by reference.

BACKGROUND

Example embodiments relate to a display device and a multiplexing driving method thereof. As a resolution of a display device increases, a size of a source driver that drives the display increases. The source driver includes a plurality of amplifiers connected to a plurality of data lines to supply a plurality of data signals. As the number of the plurality of amplifiers increases, the size of the source driver also increases. To suppress an increase in the size of the source driver, each amplifier may drive two or more data lines. If each amplifier drives the two or more data lines every horizontal period, there is a problem in which an artifact occurs due to a difference in a charge rate of a pixel through the two or more data lines. The charge rate of the pixel may be defined as a ratio between a level of the data signal and a signal level written in the pixel when the data signal is written in the pixel through the data line.

SUMMARY

Example embodiments are directed to a display device configured for improving a display image quality in a multiplexing driving method in which each amplifier of the display device drives two or more data lines, and a multiplexing driving method of the display device.

A display device, according to example embodiments, includes a plurality of gate lines and a plurality of data lines, a plurality of first pixels, each first pixel being connected to a first data line of the plurality of data lines and the plurality of gate lines; a plurality of second pixels, each second pixel being connected to a second data line of the plurality of data lines and the plurality of gate lines; a source driver configured to provide a first data signal to the first data line during a first time period in a horizontal period and provide a second data signal to the second data line during a second time period in the horizontal period; and a timing controller configured to: generate first compensation grayscale data by compensating for a first original grayscale data corresponding to an input grayscale for each of the plurality of first pixels based on the input grayscale and a color of each of the first pixels, multiplex the first compensation grayscale data for each of the plurality of first pixels and a second original grayscale data for each of the plurality of second pixels, and provide the multiplexed data to the source driver.

A display device, according to example embodiments, includes a first data line and a second data line; a plurality of first pixels connected to the first data line; a plurality of second pixels connected to the second data line; a source driver configured to multiplex and output a first data signal and a second data signal for the first data line and the second data line during each horizontal period; and a timing controller configured to: generate a compensation dataset according to a driving environment of the display device, generate first compensation grayscale data by compensating for first original grayscale data corresponding to an input grayscale for each of the plurality of first pixels by using a grayscale compensation value based on the input grayscale and a color of each of the first pixels in the compensation dataset, and provide the first compensation grayscale data to the source driver, wherein the first data signal is provided to the first data line.

According to example embodiments, a multiplexing driving method of the display device including a plurality of first pixels connected to a first data line and a plurality of second pixels connected to a second data line includes: generating a compensation dataset corresponding to a driving environment of the display device among a plurality of compensation datasets; detecting grayscale compensation values corresponding to two input grayscales adjacent to first original grayscale data of one of the plurality of first pixels in the compensation dataset and interpolating the two detected grayscale compensation values to generate first grayscale compensation value; generating first compensation grayscale data using the first original grayscale data and the first grayscale compensation value; supplying a first data signal according to the first compensation grayscale data to the first data line; and supplying a second data signal according to second original grayscale data of one of the plurality of second pixels to the second data line.

Example embodiments are directed to a display device configured for improving a display image quality in a multiplexing driving method, and a multiplexing driving method of the display device.

BRIEF DESCRIPTION OF THE DRAWINGS

FIGS. 11(*a*), 11(*b*), and 11(*c*) illustrate methods for generating the final grayscale data according to example embodiments of FIG. 7 and/or FIG. 9.

FIGS. 12(*a*), 12(*b*), and 12(*c*) illustrate methods for generating the final grayscale data according to the example embodiments of FIG. 8 and/or FIG. 10.

FIGS. 14(*a*), 14(*b*), and 14(*c*) illustrate methods for generating the final grayscale data according to example embodiments of FIG. 7, FIG. 9, and/or FIG. 13.

FIGS. 15(*a*), 15(*b*), and 15(*c*) illustrate methods for generating the final grayscale data, according to example embodiments of FIG. 8, FIG. 10, and/or FIG. 13.

DETAILED DESCRIPTION

Example embodiments are directed to a display device that may control a method for generating a plurality of first data signals and a plurality of second data signals provided to a plurality of first data lines and a plurality of second data lines among a plurality of data lines. In a multiplexing driving method, the display device may supply the plurality of first data signals to the plurality of first data lines, and the plurality of first data signals may be charged by the plurality of first data lines. For example, the plurality of first data signals may be charged by a plurality of parasitic capacitors of the plurality of first data lines. Each voltage of a plurality of voltages provided to each of the plurality of first data lines may be written in each of a plurality of first pixels connected to the plurality of first data lines. The display device may write the plurality of second data signals in each of a plurality of second pixels connected to the plurality of second data lines through each of the plurality of second data lines. The display device may compensate for an input grayscale for the first pixel to compensate for a luminance displayed by the first pixel based on a luminance displayed by the second pixel. The display device may compensate for an input grayscale for the second pixel to compensate for a luminance displayed by the second pixel based on a luminance displayed by the first pixel.

Figure 1:
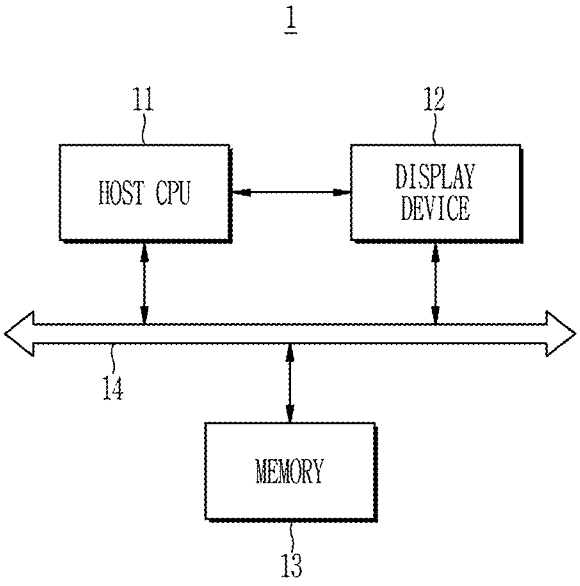
FIG. 1 is a block diagram showing an electronic device, according to some example embodiments.

FIG. 1 is a block diagram showing an electronic device, according to some example embodiments.

As shown in FIG. 1, the electronic device 1 may include a host central processing unit (CPU) 11, a display device 12, and a memory device 13. The electronic device 1 may include at least one of various electronic devices including a display such as a smartphone, a tablet personal computer (PC), a mobile phone, a video phone, an e-book reader, a desktop personal computer (PC), a laptop personal computer (PC), a netbook computer, a workstation, a server, a mobile medical device, a smart glass, a head mounted device (HMD), or the like.

The host CPU 11 may execute a plurality of application software controlling an overall operation of the electronic device 1 on an operating system (OS). The host CPU 11 may generate frame data, or may receive frame data. The host CPU 11 may directly transmit the frame data to the display device 12, or may store the frame data in a memory 13. The host CPU 11 and the display device 12 may be integrated and implemented, or may be implemented as a separate device coupled through an interface between the display device 12 and the host CPU 11.

The memory 13 may write data or may read and output data according to a command of the host CPU 11. The memory 13 may store data necessary for an operation of the display device 12 together with the frame data. The display device 12 may request from the memory 13 data necessary for driving (e.g., operating) the display device 12, and the memory 13 may read data corresponding to the request and output the read data to the display device 12. Alternatively, the display device 12 may request from the memory 13 data necessary for driving (e.g., operating) the display device 12, the host CPU 11 may transmit a command corresponding to the request to the memory 13, and the memory 13 may read and output the data according to the command.

Data transmission and reception between the host CPU 11, the display device 12, and the memory 13 may be performed through a bus 14. Data transmission and reception between components in the electronic device 1 may be performed using a wire other than the bus 14.

Figure 2:
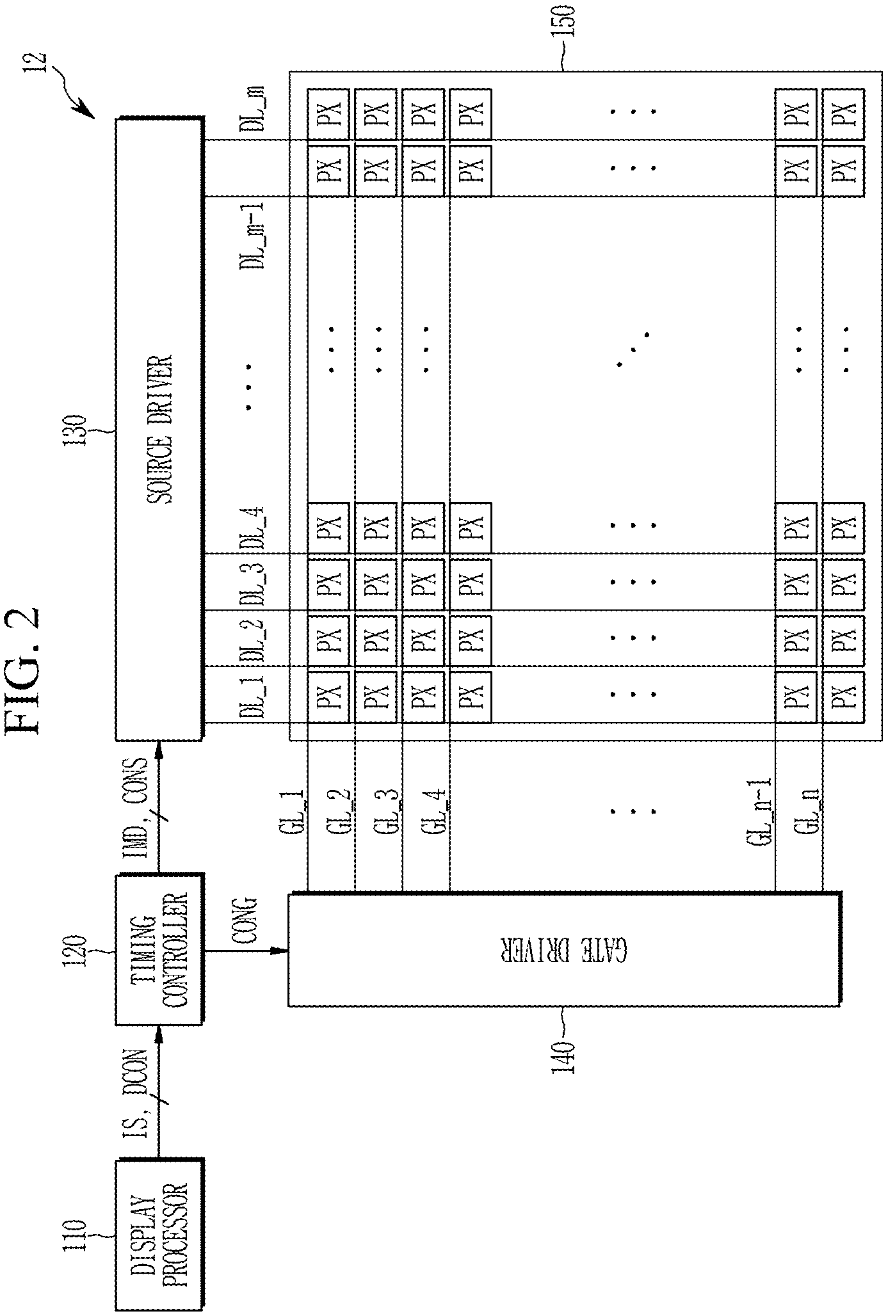
FIG. 2 is a block diagram schematically showing a configuration of the display device, according to some example embodiments.

FIG. 2 is a block diagram schematically showing a configuration of the display device, according to some example embodiments.

The display device 12 may include a display processor 110, a timing controller 120, a source driver 130, a gate driver 140, and a display panel 150. A display driving IC (DDI) may include the source driver 130 and the gate driver 140, or may further include the timing controller 120.

The display processor 110 may receive the frame data from the host CPU 11 together with a frame update command, may perform image signal processing on the frame data in response to the frame update command to generate an image signal IS, may generate a control signal DCON for driving the display device 12, and may provide the image signal IS and the control signal DCON to the timing controller 120. The image signal processing may include converting the frame data to generate an image signal suitable for displaying using the display panel 150 based on a characteristic of the display panel 150. The image signal IS may be a signal indicating an image to be displayed by the display device 12, and the control signal DCON may include a vertical synchronization signal, a horizontal synchronization signal, a data enable signal, a main clock signal, or the like required for the display device 12 to display the image signal IS. The display processor 110 may include a graphic processing unit (GPU), a visual processing unit (VPU), or the like that may convert the frame data into the image signal IS.

The timing controller 120 may generate an image data signal IMD for a plurality of pixels PX according to the image signal IS for each frame provided from the display processor 110. The timing controller 120 may provide the image data signal IMD to the source driver 130 according to the horizontal synchronization signal at every frame defined by the vertical synchronization signal.

The timing controller 120 may generate the image data signal IMD by processing the image signal IS. The image signal IS may include grayscale data indicating a grayscale of each of the plurality of pixels and address data indicating a position of each of the plurality of pixels. The timing controller 120 may determine whether the grayscale of the grayscale data is compensated based on the position of each pixel. If the timing controller 120 determines the compensation of the grayscale, the timing controller 120 may determine compensation grayscale data corresponding to the grayscale data in a compensation dataset corresponding to a driving environment of the display device 12. The timing controller 120 may combine the compensation grayscale data with the grayscale data, may determine a gain according to a position of the pixel, and may generate the image data signal according to the compensation grayscale data and the gain. If the timing controller 120 determines that there is no grayscale compensation, the timing controller 120 may generate the grayscale data as the image data signal. The driving environment of the display device 12 may include factors that affect driving of the display device 12, such as a temperature of the display device 12, an operating frequency of the display device 12, a brightness of the display specified by a user, and the like.

The timing controller 120 may generate a source control signal CONS that controls an operation of the source driver 130 and a gate control signal CONG that controls an operation of the gate driver 140 according to the control signal.

The source driver 130 may convert the image data signal into a plurality of data signals for a plurality of data lines DL_1-DL_m according to the source control signal CONS every horizontal period, and may output the plurality of data signals to the plurality of data lines DL_1-DL_m.

The gate driver 140 may generate a gate signal with an ON level according to the gate control signal CONG every horizontal period to output the gate signal to the gate line corresponding to the gate signal. The gate driver 140 may supply a plurality of gate signals having ON levels to a plurality of gate lines GL_1-GL_n in a sequential or non-sequential order every frame. Depending on an ON-level pulse of the gate signal, switching transistors of the plurality of pixels PX connected to the gate line corresponding to the gate signal may be turned ON. Then, the plurality of data signals supplied through the plurality of data lines DL_1-DL_m may be written in the plurality of pixels.

According to the source control signal CONS and the gate control signal CONG, a timing at which the source driver 130 supplies the plurality of data signals to the plurality of data lines DL_1-DL_m and a timing at which the gate driver 140 supplies the gate signal with the ON level to each of the plurality of gate lines may be synchronized with each other.

Figure 3A:
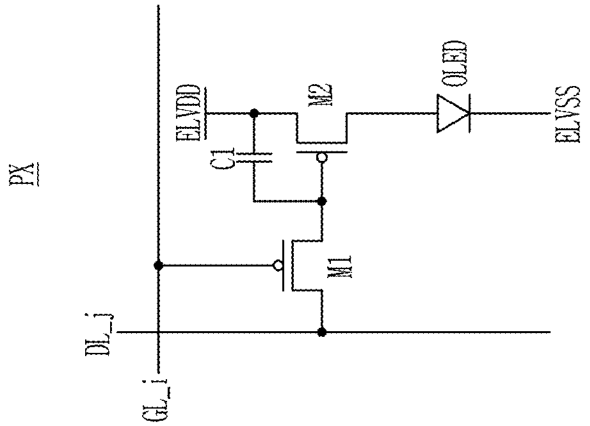
FIG. 3A and FIG. 3B are circuit diagrams showing pixel circuits, according to some example embodiments.
Figure 3B:
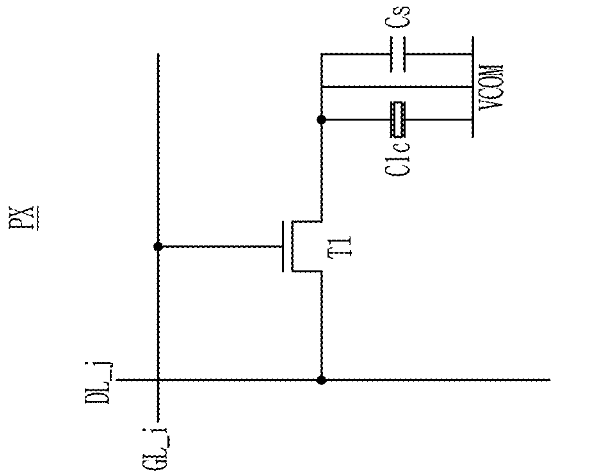

Referring briefly to FIG. 3A and FIG. 3B, illustrated are circuit diagrams showing pixel circuits, according to some example embodiments.

FIG. 3A illustrates a circuit of the pixel PX including an organic light-emitting diode (OLED) as a light-emitting device, according to some example embodiments. As shown in FIG. 3A, the pixel PX may include a switching transistor M1, a driving transistor M2, and a capacitor C1. A gate of the switching transistor M1 is connected to the gate line GL_j, one end of the switching transistor M1 is connected to the data line DL_j, and the other end of the switching transistor M1 is connected to a gate of the driving transistor M2. A voltage ELVDD for driving the pixel PX is supplied to a source of the driving transistor M2, and a drain of the driving transistor M2 is connected to an anode of the OLED. A voltage ELVSS may be supplied to a cathode of the OLED. If the switching transistor M1 is turned ON by the gate signal with the ON level supplied through the gate line GL_i, the data signal of the data line DL_j may be stored in the capacitor C1. The driving transistor M2 may supply a driving electric current to the OLED according to a voltage stored in the capacitor C1. Because the switching transistor M1 is a p-channel type transistor, the ON level of the gate signal may be a low level.

FIG. 3B illustrates a circuit of the pixel PX using a liquid crystal (LC) as a display element, according to some example embodiments. The pixel PX may include a switching transistor T1, a liquid crystal element Clc, and a capacitor Cs. A gate of the switching transistor T1 is connected to the gate line GL_i, one end of the switching transistor T1 is connected to the data line DL_j, and the other end of the switching transistor T1 is connected to one end of each of the liquid crystal element Clc and the capacitor Cs. A common voltage VCOM may be supplied to the other end of each of the liquid crystal element Clc and the capacitor Cs. If the switching transistor T1 is turned on by the gate signal with the ON level supplied through the gate line GL_i, the data signal of the data line DL_j may be stored in the capacitor Cs, and the liquid crystal element Clc may adjust a direction of light according to the data signal. Because the switching transistor T1 is an n-channel type transistor, the ON level of the gate signal may be a high level.

The circuit of the pixel PX shown in each of FIG. 3A and FIG. 3B is merely an example, provided for the sake of discussion, and it will be understood that different circuit configurations of the pixel PX are equally applicable without departing from the scope of the disclosure.

Returning to FIG. 2, the display panel 150 may display an image according to the plurality of data signals and the plurality of gate signals provided from the source driver 130 and the gate driver 140. In example embodiments, the display panel 150 may be implemented as a thin film transistor liquid crystal display (TFT-LCD) panel, a light emitting diode (LED) display panel, an organic LED (OLED) display panel, an active matrix (AMOLED) display panel, a flexible display panel, or the like. In example embodiments, the display panel 150 may be implemented as a low-temperature polycrystalline oxide (LTPO) panel.

The display panel 150 may include the plurality of data lines DL_1-DL_m, a plurality of gate lines GL_1-GL_n, and the plurality of pixels PX. The plurality of data lines DL_1-DL_m may be disposed along a first direction, the plurality of gate lines GL_1-GL_n may be disposed along a second direction transverse to the first one direction, the plurality of pixels PX may be disposed in a matrix form at the intersection of corresponding data lines and gate lines, and each pixel PX may be connected to the corresponding data line and the gate line. The plurality of pixels PX may be divided into row units according to a disposition direction of each of the plurality of gate lines GL_1-GL_n, and this is referred to as a pixel row. The plurality of pixels PX may be divided into column units according to a disposition direction of each of the plurality of data lines DL_1-DL_m, and this is referred to as a pixel column. Each of the plurality of pixels PX may be one color among a red (R) pixel, a green (G) pixel, and a blue (B) pixel. For the sake of discussion, the pixel is defined as a unit that displays one color. Each of the plurality of pixels PX may store the data signal supplied to each pixel through the data line in synchronization with the gate signal supplied to each pixel through the gate line, and may emit light with a grayscale according to the data signal. The pixel may be a light-emitting element, and may include an organic light-emitting diode or a liquid crystal element.

Figure 4:
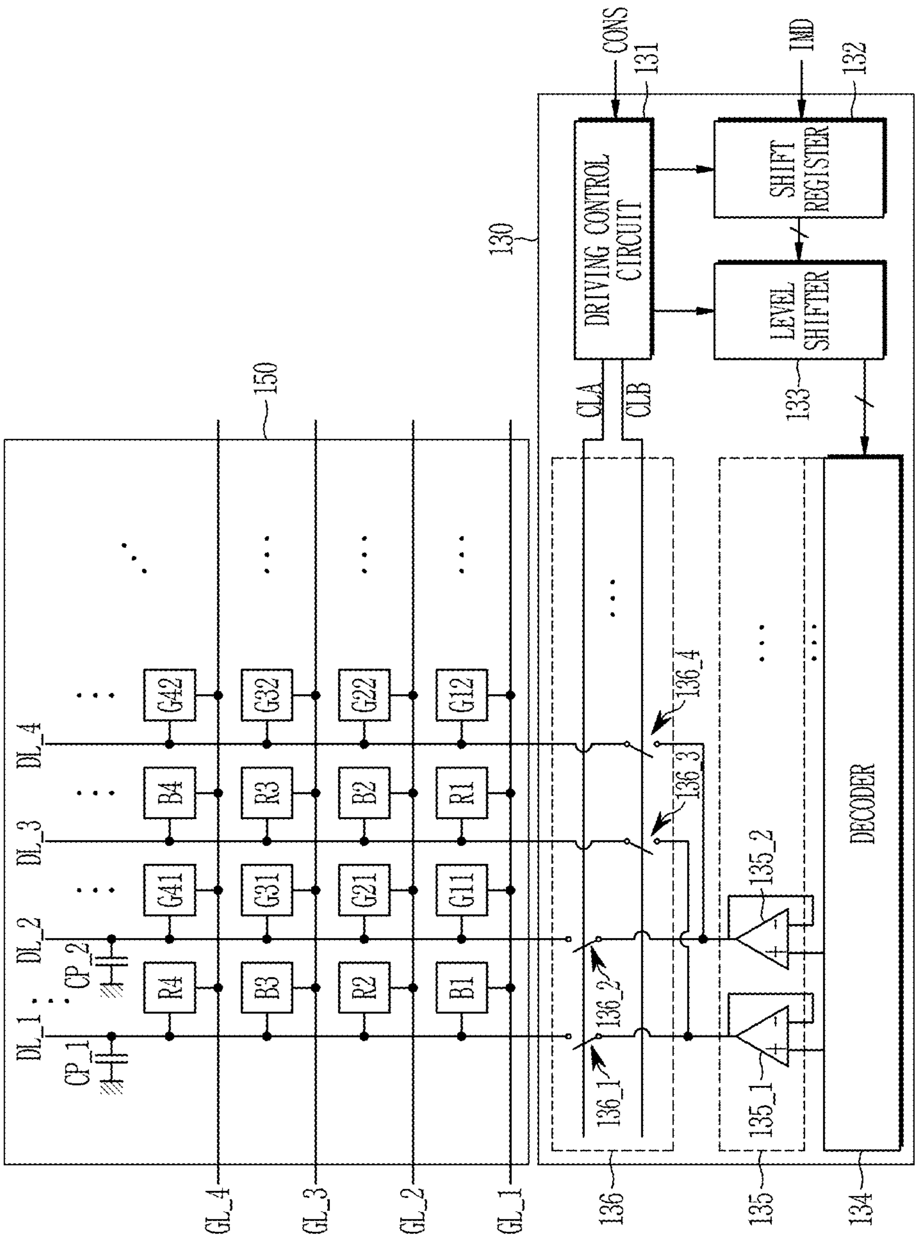
FIG. 4 illustrates a configuration of the source driver and the display panel, according to some example embodiments.

FIG. 4 illustrates configurations of the source driver 130 and the display panel 150, according to some example embodiments.

For the sake of explanation, FIG. 4 illustrates four data lines DL_1, DL_2, DL_3, and DL_4 among the plurality of data lines DL_1-DL_m, two amplifiers 135_1 and 135_2, and a portion of a source multiplexing circuit 136.

According to the multiplexing driving method, the source driver 130 may supply the plurality of data signals to a plurality of first data lines (e.g., DL_1 and DL_2) among the plurality of data lines DL_1, DL_2, DL_3, and DL_4 during a first time period of one horizontal period and may supply a plurality of second data signals to a plurality of second data signals (e.g., DL_3 and DL_4) among the plurality of data lines DL_1, DL_2, DL_3, and DL_4 during a second time period of one horizontal period.

A plurality of red pixels R2 and R4 and a plurality of blue pixels B1 and B3 are alternately connected to the first data line DL_1 among the plurality of first data lines DL_1 and DL_2, and a plurality of blue pixels B2 and B4 and a plurality of red pixels R1 and R3 are alternately connected to the second data line DL_3 among the plurality of second data lines DL_3 and DL_4. A plurality of green pixels G11, G21, G31, and G41 are connected to the first data line DL_2 among the plurality of first data lines DL_1 and DL_2, and a plurality of green pixels G12, G22, G32, and G42 are connected to the second data line DL_4 among the plurality of second data lines DL_3 and DL_4. As described above, the red (R) pixel, the green (G) pixel, and the blue (B) pixel may be arranged in a pattern in which pixel columns with four data line units are repeated. A pattern of the pixels shown in FIG. 4 is merely an example, and example embodiments are not limited thereto.

A voltage charged in each of a plurality of parasitic capacitors CP_1 and CP_2 connected to each of the plurality of first data lines DL_1 and DL_2 may be written in the pixel. A parasitic capacitor is also formed in each of the plurality of second data lines DL_3 and DL_4, but, for the sake of discussion, the parasitic capacitor of each of the plurality of second data lines DL_3 and DL_4 is not considered to be involved in writing of the data signal in the pixel so that the parasitic capacitor of each of the plurality of second data lines is omitted in FIG. 4.

As shown in FIG. 4, the source driver 130 may include a driving control circuit 131, a shift register 132, a level shifter 133, a decoder 134, an output amplification circuit 135, and the source multiplexing circuit 136.

The driving control circuit 131 may generate a clock signal or control signals for controlling an operation of each component of the source driver 130 according to the source control signal CONS to provide the control signal corresponding to each component. For example, the driving control circuit 131 may be configured to generate and provide two multiplexing signals CLA and CLB that control a multiplexing operation of the source multiplexing circuit 136.

The shift register 132 may store the image data signal IMD by shifting the image data signal IMD in a unit of one pixel, and may provide a plurality of pixel-unit image data of one pixel row to the level shifter 34 according to a latch signal provided from the driving control circuit 131. The pixel-unit image data are referred to as pixel data.

The level shifter 133 may shift a digital signal level constituting each of a plurality of pixel data corresponding to one pixel row to provide the shifted level to the decoder 134. For example, an operating voltage range of the decoder 134 may be higher than an operating voltage range of the shift register 132. Therefore, the level shifter 133 may increase a digital signal level constituting each of a plurality of grayscale data to a digital signal level that may be processed by the decoder 134.

The decoder 134 may receive the plurality of pixel data from the level shifter 133, and may convert each of the plurality of pixel data that is a digital signal into each of the plurality of data signals that is an analog signal. The decoder 134 may generate a plurality of grayscale voltages corresponding to each of a plurality of grayscales using a plurality of gamma voltages and a plurality of resistor strings. The decoder 134 may generate each of the plurality of data signals by selecting one of the plurality of grayscale voltages according to each of the plurality of pixel data. The decoder 134 may be implemented as a digital-analog converter that converts the pixel data that is a digital signal into the data signal that is an analog signal.

The output amplification circuit 135 may include a plurality of amplifiers 135_1 and 135_2, and each of the plurality of amplifiers 135_1 and 135_2 may receive each of the plurality of data signals from the decoder 134 to output each of the plurality of data signals. Each of the plurality of amplifiers 135_1 and 135_2 may be implemented as an operational amplifier. An output of the operational amplifier may be connected (e.g., feedback) to a negative input terminal (−) thereof, a positive input terminal (+) of the operational amplifier may be connected to the decoder 134, and the data signal may be input to the positive input terminal (+).

The source multiplexing circuit 136 may include a plurality of switching elements 136_1, 136_2, 136_3, and 136_4 connected between the plurality of amplifiers 135_1 and 135_2 and the plurality of data lines DL_1-DL_4. The plurality of switching elements 136_1, 136_2, 136_3, and 136_4 may perform a switching operation according to one of the multiplexing signals CLA and CLB provided from the driving control circuit 131. For example, the plurality of switching elements 136_1 and 136_2 may perform a switching operation according to the multiplexing signal CLA, and the plurality of switching elements 136_3 and 136_4 may perform a switching operation according to the multiplexing signal CLB. The plurality of switching elements 136_1 and 136_2 may be turned on during a first time period in which the multiplexing signal CLA is at an ON level, and the plurality of switching elements 136_3 and 136_4 may be turned on during a second time period in which the multiplexing signal CLB is at an ON level.

One end of the switching element 136_1 may be connected to the data line DL_1, and the other end of the switching element 136_1 may be connected to an output end of the amplifier 135_1. One end of the switching element 136_2 may be connected to the data line DL_2, and the other end of the switching element 136_2 may be connected to an output end of the amplifier 135_2. One end of the switching element 136_3 may be connected to the data line DL_3, and the other end of the switching element 136_3 may be connected to an output end of the amplifier 135_1. One end of the switching element 136_4 may be connected to the data line DL_4, and the other end of the switching element 136_4 may be connected to an output end of the amplifier 135_2.

Figure 5:
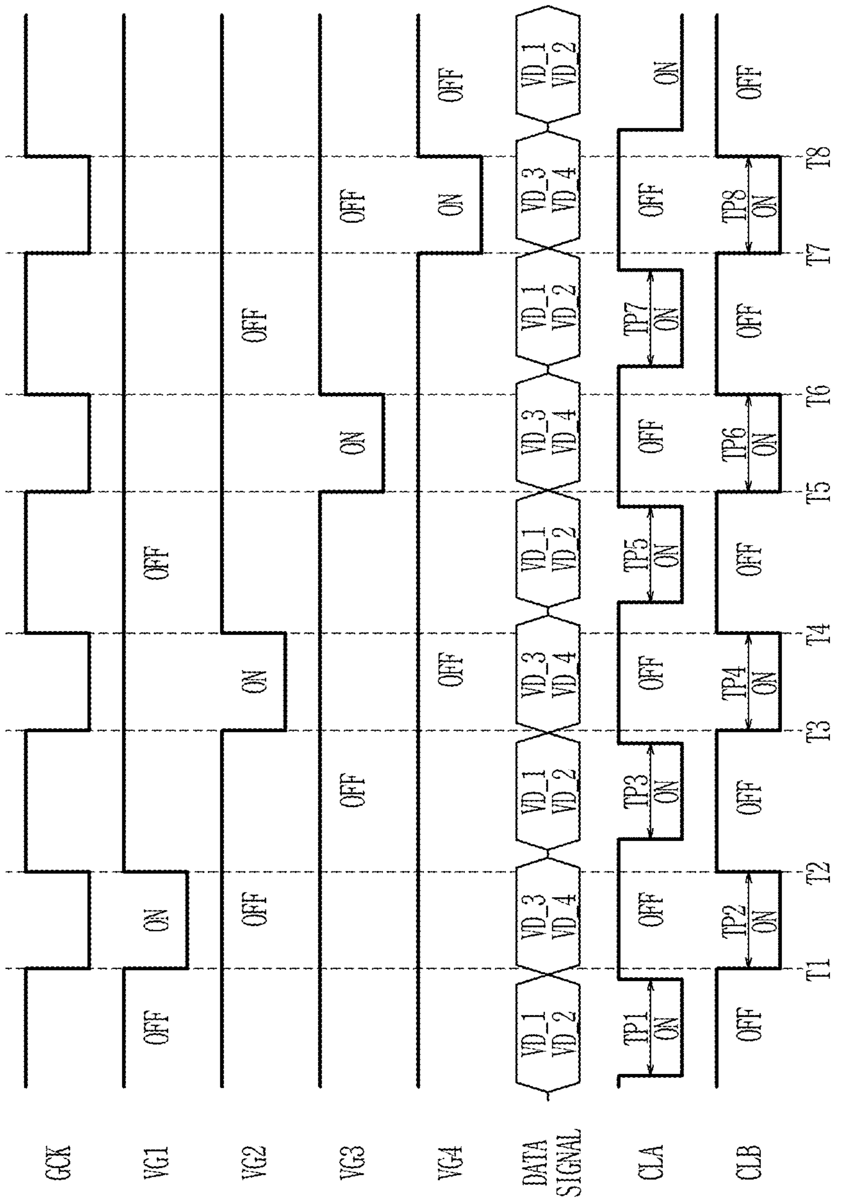
FIG. 5 is a timing diagram showing waveforms of the multiplexing signal and the gate signal, according to some example embodiments.

FIG. 5 is a timing diagram showing waveforms of the multiplexing signal and the gate signal, according to some example embodiments.

FIG. 5 shows a waveform of a gate clock signal GCK included in the gate control signal CONG. The gate driver (or a gate driving circuit) 140 may sequentially generate a plurality of gate signals VG1, VG2, VG3, and VG4 in a unit of one period of the gate clock signal GCK to provide the generated gate signals to the plurality of gate lines GL_1, GL_2, GL_3, and GL_4. As shown in FIG. 5, the plurality of gate signals VG1, VG2, VG3, and VG4 may sequentially have ON levels in a time period T1-T2, a time period T3-T4, a time period T5-T6, and a time period T7-T8. Although FIG. 5 shows that an ON level of each of the gate signals is a low level, the ON level of each of the gate signals may be changed according to a channel type of the switching transistor of the circuit of the pixel PX.

In a time period TP1, the multiplexing signal CLA may be at an ON level on so that the plurality of switching elements 136_1 and 136_2 are turned ON. Then, the plurality of amplifiers 135_1 and 135_2 may be connected to the plurality of data lines DL_1 and DL_2, respectively. In the time period TP1, the decoder 134 may supply each of a plurality of data signals VD_1 and VD_2 to each of the plurality of amplifiers 135_1 and 135_2, and each of the plurality of amplifiers 135_1 and 135_2 may supply each of the plurality of data signals VD_1 and VD_2 to each of the plurality of data lines DL_1 and DL_2. In example embodiments, the data signal VD_1 may be grayscale data to be written in a blue pixel B1 connected to the gate line GL_1 and the data line DL_1, and the data signal VD_2 may be grayscale data to be written in a green pixel G11 connected to the gate line GL_1 and the data line DL_2. Because the gate signal VG1 is at the OFF level in the time period TP1, the plurality of data signals VD_1 and VD_2 may be charged in the parasitic capacitors CP_1 and CP_2 of the plurality of data lines DL_1 and DL_2, respectively. If the gate signal VG1 is at the ON level in the time period T1-T2, the voltage charged in each of the parasitic capacitors CP_1 and CP_2 may be supplied to each of the blue pixel B1 and the green pixel G11. As shown in FIG. 5, the time period TP1 and the time period T1-T2 do not overlap.

In a time period TP2, the multiplexing signal CLB may be turned ON so that the plurality of switching elements 136_3 and 136_4 are turned ON. Then, the plurality of amplifiers 135_1 and 135_2 may be connected to the plurality of data lines DL_3 and DL_4, respectively. In the time period TP2, the decoder 134 may supply each of a plurality of data signals VD_3 and VD_4 to each of the plurality of amplifiers 135_1 and 135_2, and each of the plurality of amplifiers 135_1 and 135_2 may supply each of the plurality of data signals VD_3 and VD_4 to each of the plurality of data lines DL_3 and DL_4. In example embodiments, the data signal VD_3 may be grayscale data to be written in a red pixel R1 connected to the gate line GL_1 and the data line DL_3, and the data signal VD_4 may be grayscale data to be written in a green pixel G12 connected to the gate line GL_1 and the data line DL_4. Because the gate signal VG1 is at the ON level in the time period T1-T2 and the time period TP2 and the time period T1-T2 overlap, each of the plurality of data signals VD_3 and VD_4 may be supplied to each of the red pixel R1 and the green pixel G12 through each of the plurality of data lines DL_3 and DL_4.

The plurality of switching elements 136_1 and 136_2 may be turned ON by the multiplexing signal CLA with an ON level in a time period TP3, and each of the plurality of amplifiers 135_1 and 135_2 may be connected to each of the plurality of data lines DL_1 and DL_2. In the time period TP3, the decoder 134 may supply each of the plurality of data signals VD_1 and VD_2 to each of the plurality of amplifiers 135_1 and 135_2, and each of the plurality of amplifiers 135_1 and 135_2 may supply each of the plurality of data signals VD_1 and VD_2 to each of the plurality of data lines DL_1 and DL_2. In this case, the data signal VD_1 may be grayscale data to be written in a red pixel R2 connected to the gate line GL_2 and the data line DL_1, and the data signal VD_2 may be grayscale data to be written in a green pixel G21 connected to the gate line GL_2 and the data line DL_2. Because the gate signal VG2 is at an OFF level in the time period TP3, the plurality of data signals VD_1 and VD_2 may be charged in the parasitic capacitors CP_1 and CP_2 of the plurality of data lines DL_1 and DL_2, respectively. If the gate signal VG2 is at the ON level in the time period T3-T4, the voltage charged in each of the parasitic capacitors CP_1 and CP_2 may be supplied to each of the red pixel R2 and the green pixel G21.

The plurality of switching elements 136_3 and 136_4 may be turned ON by the multiplexing signal CLB with an ON level in a time period TP4, and each of the plurality of amplifiers 135_1 and 135_2 may be connected to each of the plurality of data lines DL_3 and DL_4. In the time period TP4, the decoder 134 may supply each of the plurality of data signals VD_3 and VD_4 to each of the plurality of amplifiers 135_1 and 135_2, and each of the plurality of amplifiers 135_1 and 135_2 may supply each of the plurality of data signals VD_3 and VD_4 to each of the plurality of data lines DL_3 and DL_4. In this case, the data signal VD_3 may be grayscale data to be written in a blue pixel B2 connected to the gate line GL_2 and the data line DL_3, and the data signal VD_4 may be grayscale data to be written in a green pixel G22 connected to the gate line GL_2 and the data line DL_4. Because the gate signal VG2 is at the ON level in the time period T3-T4 and the time period TP4 and the time period T3-T4 overlap, each of the plurality of data signals VD_3 and VD_4 may be supplied to each of the blue pixel B2 and the green pixel G22 through each of the plurality of data lines DL_3 and DL_4.

The plurality of switching elements 136_1 and 136_2 may be turned ON by the multiplexing signal CLA with an ON level in a time period TP5, and each of the plurality of amplifiers 135_1 and 135_2 may be connected to each of the plurality of data lines DL_1 and DL_2. In the time period TP5, the decoder 134 may supply each of the plurality of data signals VD_1 and VD_2 to each of the plurality of amplifiers 135_1 and 135_2, and each of the plurality of amplifiers 135_1 and 135_2 may supply each of the plurality of data signals VD_1 and VD_2 to each of the plurality of data lines DL_1 and DL_2. In this case, the data signal VD_1 may be grayscale data to be written in a blue pixel B3 connected to the gate line GL_3 and the data line DL_1, and the data signal VD_2 may be grayscale data to be written in a green pixel G31 connected to the gate line GL_3 and the data line DL_2. Because the gate signal VG3 is at an OFF level in the time period TP5, the plurality of data signals VD_1 and VD_2 may be charged in the parasitic capacitors CP_1 and CP_2 of the plurality of data lines DL_1 and DL_2, respectively. If the gate signal VG3 is at the ON level in the time period T5-T6, the voltage charged in each of the parasitic capacitors CP_1 and CP_2 may be supplied to each of the blue pixel B3 and the green pixel G31.

The plurality of switching elements 136_3 and 136_4 may be turned ON by the multiplexing signal CLB with an ON level in a time period TP6, and each of the plurality of amplifiers 135_1 and 135_2 may be connected to each of the plurality of data lines DL_3 and DL_4. In the time period TP6, the decoder 134 may supply each of the plurality of data signals VD_3 and VD_4 to each of the plurality of amplifiers 135_1 and 135_2, and each of the plurality of amplifiers 135_1 and 135_2 may supply each of the plurality of data signals VD_3 and VD_4 to each of the plurality of data lines DL_3 and DL_4. In this case, the data signal VD_3 may be grayscale data to be written in a red pixel R3 connected to the gate line GL_3 and the data line DL_3, and the data signal VD_4 may be grayscale data to be written in a green pixel G32 connected to the gate line GL_3 and the data line DL_4. Because the gate signal VG3 is at the ON level in the time period T5-T6 and the time period TP6 and the time period T5-T6 overlap, each of the plurality of data signals VD_3 and VD_4 may be supplied to each of the red pixel R3 and the green pixel G32 through each of the plurality of data lines DL_3 and DL_4.

The plurality of switching elements 136_1 and 136_2 may be turned ON by the multiplexing signal CLA with an ON level in a time period TP7, and each of the plurality of amplifiers 135_1 and 135_2 may be connected to each of the plurality of data lines DL_1 and DL_2. In the time period TP7, the decoder 134 may supply each of the plurality of data signals VD_1 and VD_2 to each of the plurality of amplifiers 135_1 and 135_2, and each of the plurality of amplifiers 135_1 and 135_2 may supply each of the plurality of data signals VD_1 and VD_2 to each of the plurality of data lines DL_1 and DL_2. In this case, the data signal VD_1 may be grayscale data to be written in a red pixel R4 connected to the gate line GL_4 and the data line DL_1, and the data signal VD_2 may be grayscale data to be written in a green pixel G41 connected to the gate line GL_4 and the data line DL_2. Because the gate signal VG4 is at an OFF level in the time period TP7, the plurality of data signals VD_1 and VD_2 may be charged in the parasitic capacitors CP_1 and CP_2 of the plurality of data lines DL_1 and DL_2, respectively. If the gate signal VG4 is at the ON level in a time period T7-T8, the voltage charged in each of the parasitic capacitors CP_1 and CP_2 may be supplied to each of the red pixel R4 and the green pixel G41.

The plurality of switching elements 136_3 and 136_4 may be turned ON by the multiplexing signal CLB with an ON level in a time period TP8, and each of the plurality of amplifiers 135_1 and 135_2 may be connected to each of the plurality of data lines DL_3 and DL_4. In the time period TP8, the decoder 134 may supply each of the plurality of data signals VD_3 and VD_4 to each of the plurality of amplifiers 135_1 and 135_2, and each of the plurality of amplifiers 135_1 and 135_2 may supply each of the plurality of data signals VD_3 and VD_4 to each of the plurality of data lines DL_3 and DL_4. In this case, the data signal VD_3 may be grayscale data to be written in a blue pixel B4 connected to the gate line GL_4 and the data line DL_3, and the data signal VD_4 may be grayscale data to be written in a green pixel G42 connected to the gate line GL_4 and the data line DL_4. Because the gate signal VG4 is at the ON level in the time period T7-T8 and the time period TP8 and the time period T7-T8 overlap, each of the plurality of data signals VD_3 and VD_4 may be supplied to each of the blue pixel B4 and the green pixel G42 through each of the plurality of data lines DL_3 and DL_4.

Figure 6:
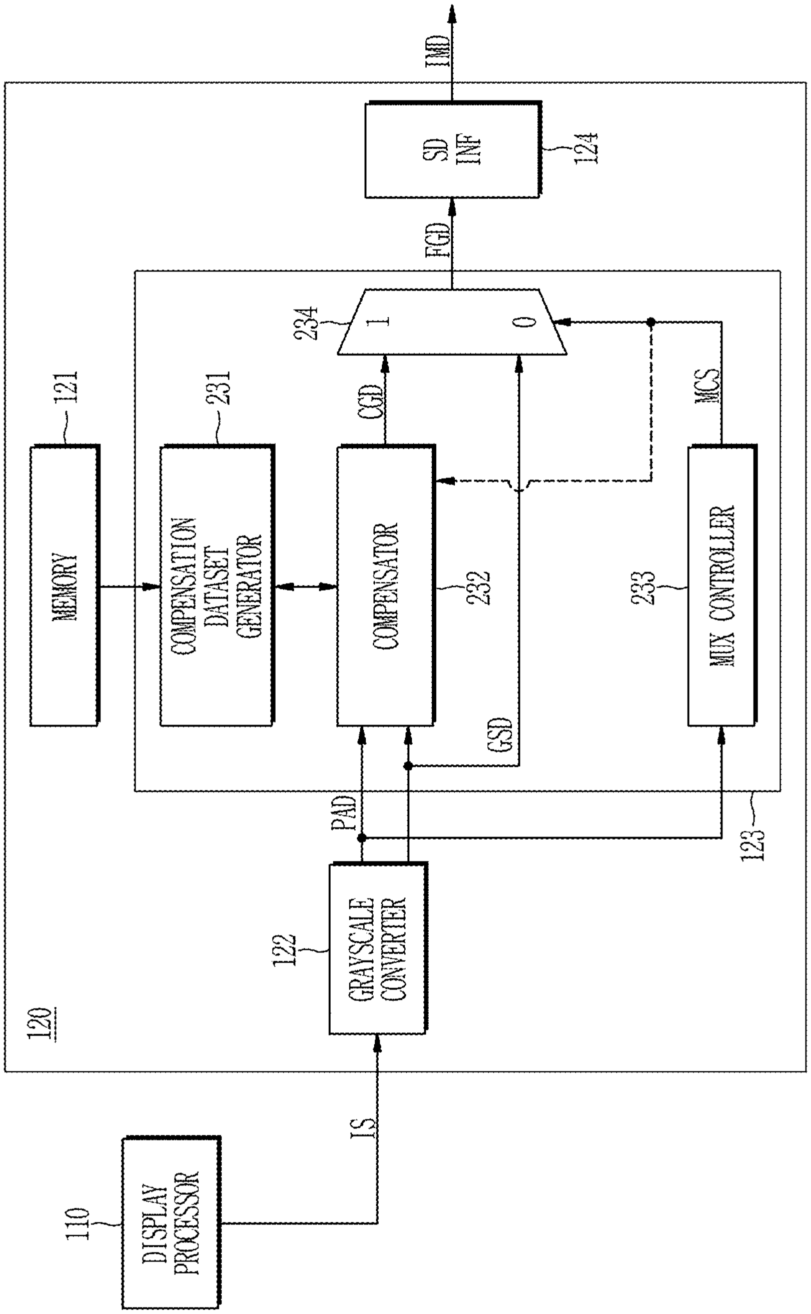
FIG. 6 is a block diagram of a configuration of the timing controller, according to some example embodiments.

FIG. 6 is a block diagram of a configuration of the timing controller, according to some example embodiments. In FIG. 6, the timing controller 120 is configured to process the image signal IS to generate the image data signal IMD. The timing controller 120 may include a memory 121, a grayscale converter 122, a compensation circuit 123, and a source driver interface (SD INF) 124. The memory 121 may store information that may be utilized when operating the timing controller 120. For example, the memory 121 may store each of a plurality of compensation datasets in a form of a look-up table corresponding to each of a plurality of driving environments of the display device 12. The memory 121 may be implemented as a read only memory (ROM), a flash memory, or the like. The grayscale converter 122 may convert the image signal IS into grayscale data GSD in a unit of the pixel, and may generate a pixel address PAD corresponding to each grayscale data GSD to provide the pixel address PAD to the compensation circuit 123. The source driver interface (SD INF) 124 may latch final grayscale data FGD that is an output of the compensation circuit 123 to convert the latched data into image data IMD.

The compensation circuit 123 may include a compensation dataset generator 231, a compensator 232, a multiplexer (MUX) controller 233, and a multiplexer 234. The compensation circuit 123 may generate the compensation dataset according to the driving environment of the display device 12, may compensate the grayscale data GSD using the compensation dataset according to a position of the pixel so that it may generate compensation grayscale data CGD and outputs the final grayscale data FGD or may output the grayscale data GSD as the final grayscale data FGD without compensating the grayscale data GSD.

Figure 7:
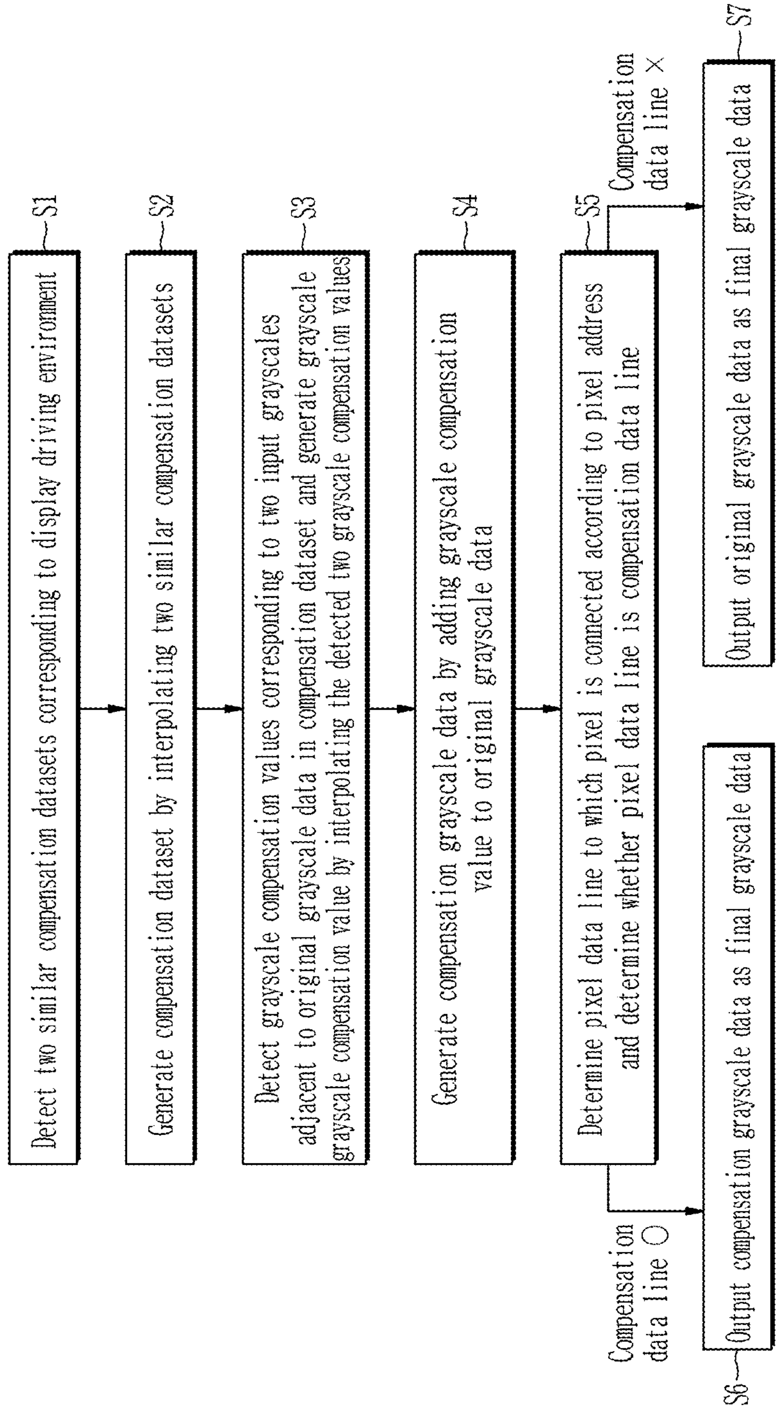
FIG. 7 is a flowchart of a method of operation of the compensation circuit of FIG. 6, according to some example embodiments.

FIG. 7 is a flowchart of a method 700 of operation of the compensation circuit 123 of FIG. 6, according to some example embodiments. It is understood that additional operations can be provided before, during, and after the operations in FIG. 7, and some of the operations described below can be replaced or eliminated, for additional embodiments of the method. The order of the operations/processes may be interchangeable, or two or more operations can be performed simultaneously.

The compensation dataset generator 231 may detect a similar compensation dataset corresponding to the driving environment (hereinafter referred to as a display driving environment) of the display device 12 among the plurality of compensation datasets in the memory 121 (S1). Each of the plurality of compensation datasets may include grayscale compensation values for each color and grayscale for compensating for an artifact that occurs when the display device displays a screen according to the multiplexing driving method in the driving environment. For example, when a gray scale to be displayed by the plurality of pixels connected to the data line DL_1 is the same as a gray scale to be displayed by the plurality of pixels connected to the data line DL_3, a voltage charged in the parasitic capacitor CP_1 may be written in each pixel of the data line DL_1, and a voltage supplied by the amplifier 135_1 may be written in each pixel of the data line DL_3. A deviation in a charge rate of the pixel may occur between writing of a voltage through the parasitic capacitor and writing of a voltage by the amplifier. The pixel charge rate may be determined according to a voltage stored in the capacitor C1 or the capacitor Cs that is a storage element in FIG. 3. For example, because a luminance provided by the pixels of the data line DL_3 is higher (or lower) than a luminance provided by the pixels of the data line DL_1, a vertical line due to a luminance difference between the two data lines DL_1 and DL_3 may be recognized. In general, if colors (e.g., red or blue) constituting a color pattern of the plurality of pixels connected to each of the two data lines DL_1 and DL_3 are the same, the vertical line may become more visible. Similarly, because a luminance provided by the pixels of the data line DL_4 is higher (or lower) than a luminance provided by the pixels of the data line DL_2, a vertical line due to a luminance difference between the two data lines DL_2 and DL_4 may be recognized. Similarly, if colors (e.g., green) constituting a color pattern of the plurality of pixels connected to each of the two data lines DL_2 and DL_4 are the same, the vertical line may become more visible.

To solve this, the display device 12, according to example embodiments, may compensate for grayscale data of the pixels of the data line DL_1 to compensate for the luminance difference when it generates the data signal supplying to the pixels of the data line DL_1. In the display device 12, a grayscale compensation value for the input grayscale for each color and grayscale of the pixel may be obtained by an experimental method. Each of the plurality of compensation datasets may be implemented as a look-up table in which the grayscale compensation values obtained in the driving environment are disposed for each color and each grayscale.

Table 1 is an example look-up table showing a compensation dataset including grayscale compensation values corresponding to a certain driving environment. In Table 1, each of input grayscales (g_1, g_2, g_3, g_4, g_5, . . . , g_k−1, and g_k) may be a grayscale indicated by the grayscale data, and may indicate a predetermined number of grayscales within an entire grayscale range that the grayscale data may have. In Table 1, each of (rg1, rg2, rg3, rg4, rg5, . . . , rgk−1, rgk), (gg1, gg2, gg3, gg4, gg5, . . . , ggk−1, ggk), and (bg1, bg2, bg3, bg4, bg5, . . . , bgk−1, bgk) may be grayscale compensation values for each color, and each grayscale compensation value may indicate the grayscale compensation value corresponding to the color in the input grayscale. K may be a natural number of 2 or more.

TABLE 1

| Input grayscale | | g_1 | g_2 | g_3 | g_4 | g_5 | . . . g_k − 1 | g_k |
|---|---|---|---|---|---|---|---|---|
| Grayscale compensation value | Red (R) | rg1 | rg2 | rg3 | rg4 | rg5 | . . . rgk − 1 | rgk |
| | Green (G) | gg1 | gg2 | gg3 | gg4 | gg5 | . . . ggk − 1 | ggk |
| | Blue (B) | bg1 | bg2 | bg3 | bg4 | bg5 | . . . bgk − 1 | bgk |

The display processor 110 may collect information on driving environment factors from related configurations. For example, the display processor 110 may receive temperature information from a temperature sensor provided in the display device 12 or the electronic device 1, may read a setting value indicating an operating frequency of the display device 12, and may receive brightness information from a brightness control interface of the electronic device 1. The display processor 110 may transmit the driving environment factors to the compensation dataset generator 231.

The compensation dataset generator 231 may detect two compensation datasets (hereinafter, similar compensation datasets) corresponding to two driving environments similar to the display driving environment among the plurality of compensation datasets. It may be challenging to find a compensation dataset corresponding to substantially the same driving environment as the display driving environment among the plurality of compensation datasets. To solve this, the compensation dataset generator 231 may select two driving environments similar to the display driving environment among the plurality of driving environments, and may read two similar compensation datasets corresponding to the selected two driving environments from the memory 121.

The compensation dataset generator 231 may generate the compensation dataset by interpolating two similar compensation datasets (S2). Hereinafter, the compensation dataset generated by the compensation dataset generator 231 may be referred to as an interpolation compensation dataset. The compensation dataset generator 231 may provide the interpolation compensation dataset to the compensator 232. The compensation dataset generator 231 may generate the compensation dataset by applying interpolation methods such as linear interpolation, Lagrange polynomial interpolation, or the like, to compensation values for each color and each grayscale data in each of the two similar compensation datasets.

If the compensation dataset generator 231 performs the operations S1 and S2 to generate the compensation dataset, it may be understood that a setting operation required for the compensator 232 to compensate for the grayscale data has been completed. The compensator 232 may generate the final grayscale data FGD by compensating for the grayscale data GSD representing the input grayscale using the input grayscale, the pixel address, and the compensation dataset. Hereinafter, for convenience of description, the grayscale data GSD are referred to as "original grayscale data", and the compensated grayscale data are referred to as "compensation grayscale data."

The original grayscale data GSD corresponds to the input grayscale input to the compensator 232. The compensator 232 may detect grayscale compensation values corresponding to two input grayscale values adjacent to the original grayscale data GSD in the compensation dataset, and may generate a grayscale compensation value by interpolating the detected two grayscale compensation values (S3). For example, the compensator 232 may detect the grayscale compensation value (rgi) of the input grayscale (g_i) that is less than the original grayscale data GSD and is adjacent to the original grayscale data GSD among a plurality of input grayscales for the same color (e.g., red) as a color corresponding to the original grayscale data GSD and the grayscale compensation value (rgi+1) of the input grayscale (g_i+1) that is greater than the original grayscale data GSD and is adjacent to the original grayscale data GSD in the compensation dataset. The compensator 232 may generate a grayscale compensation value (GCV) corresponding to the original grayscale data GSD by interpolating the grayscale compensation value (rg_i) and the grayscale compensation value (rgi+1).

The compensator 232 may generate the compensation grayscale data CGD by adding the grayscale compensation value (GCV) to the original grayscale data GSD (S4).

The MUX controller 233 may determine a data line (hereinafter referred to as a pixel data line) to which the pixel is connected according to the pixel address PAD, and may determine whether the pixel data line is a compensation data line (S5). If the pixel data line is the compensation data line, the MUX controller 233 may generate a control output MCS that is "1" to provide the control output to the multiplexer 234. If the pixel data line is not the compensation data line, the MUX controller 233 may generate the control output MCS that is "0" to provide the control output MCS to the multiplexer 234.

If the pixel data line is the compensation data line, the multiplexer 234 may output the compensation grayscale data CGD as the final grayscale data FGD according to the control output MCS that is "1" of the MUX controller 233 (S6).

If the pixel data line is not the compensation data line, the multiplexer 234 may output the original grayscale data GSD as the final grayscale data FGD according to the control output MCS that is "0" of the MUX controller 233 (S7).

The final grayscale data FGD output by the multiplexer 234 may be provided to the source driver interface (SD INF). The source driver interface (SD INF) may latch a plurality of final grayscale data FGD in a unit of the pixel row to convert the latched data into the image data IMD, and may transmit the converted data to the source driver 130. However, example embodiments are not limited thereto. According to some example embodiments, if an operation in which the compensation circuit 123 generates the final grayscale data FGD and an operation in which the source driver 130 processes the pixel-unit image data are synchronized with each other, the final grayscale data FGD may be directly transmitted to the source driver 130 as the image data IMD.

Figure 8:
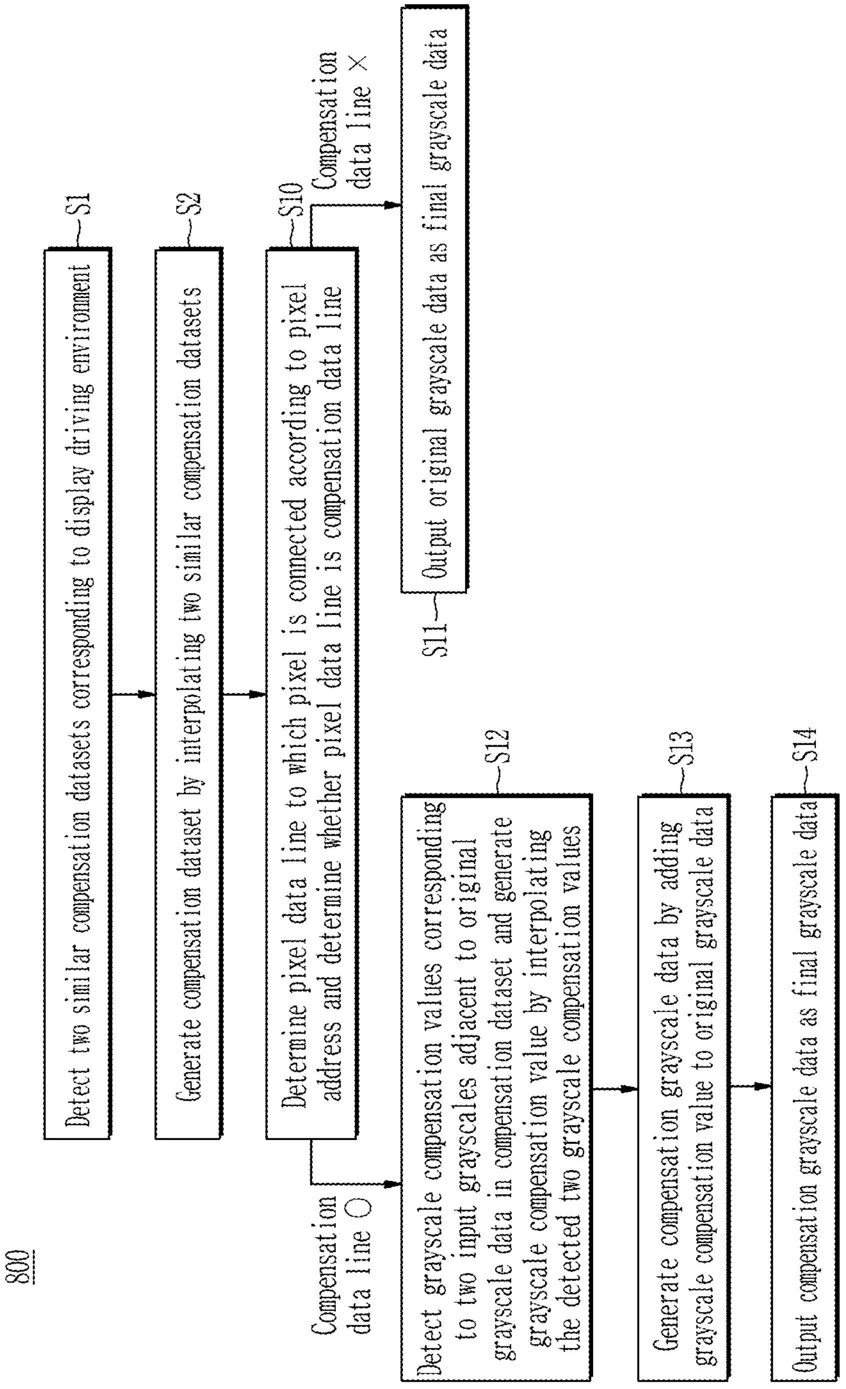
FIG. 8 is a flowchart of a method of operation of the compensation circuit, according to some example embodiments.

FIG. 8 is a flowchart of a method 800 of operation of the compensation circuit 123, according to some example embodiments. It is understood that additional operations can be provided before, during, and after the operations in FIG. 8, and some of the operations described below can be replaced or eliminated, for additional embodiments of the method. The order of the operations/processes may be interchangeable, or two or more operations can be performed simultaneously. The method 800 may be similar in some respects to the method 700 of FIG. 7, and therefore may be best understood with reference thereto where like numerals indicate like elements not described again in detail.

The operations S1 and S2 of the method 800 in FIG. 8 are similar to the operations S1 and S2 of the method 700 in FIG. 7.

The MUX controller 233 may determine the pixel data line according to the pixel address PAD, and may determine whether the pixel data line is the compensation data line (S10).

If the pixel data line is not the compensation data line as a result of the determination in the operation S10, the MUX controller 233 may provide the control output MCS that is "0" to the multiplexer 234, and the multiplexer 234 may control the original grayscale data GSD to be output as the final grayscale data FGD (S11). In this case, the original grayscale data GSD may bypass the compensator 232 and is output from the multiplexer 234 without a compensation operation being performed on it by the compensator 232. The control output MCS that is "0" of the MUX controller 233 may be provided to the compensator 232, and the compensator 232 may not operate based on the control output MCS that is "0".

If the pixel data line is the compensation data line as a result of the determination in the operation S10, the compensator 232 may detect grayscale compensation values corresponding to two grayscale data adjacent to the original grayscale data GSD in the compensation data set and may generate the grayscale compensation value (GCV) by interpolating the detected two grayscale compensation values (S12). In this case, the MUX controller 233 may generate the control output MCS that is "1" to provide the control output MCS to the compensator 232, and, in response to the control output that is "1", the compensator 232 may generate the compensation grayscale data CGD by adding the grayscale compensation value (GCV) to the original grayscale data GSD (S13).

In operation S14, the multiplexer 234 may output the compensation grayscale data CGD as the final grayscale data FGD according to the control output MCS that is "1" of the MUX controller 233.

The compensator 232 may consider a position of the pixel in determining the grayscale compensation value (GCV).

Figure 9:
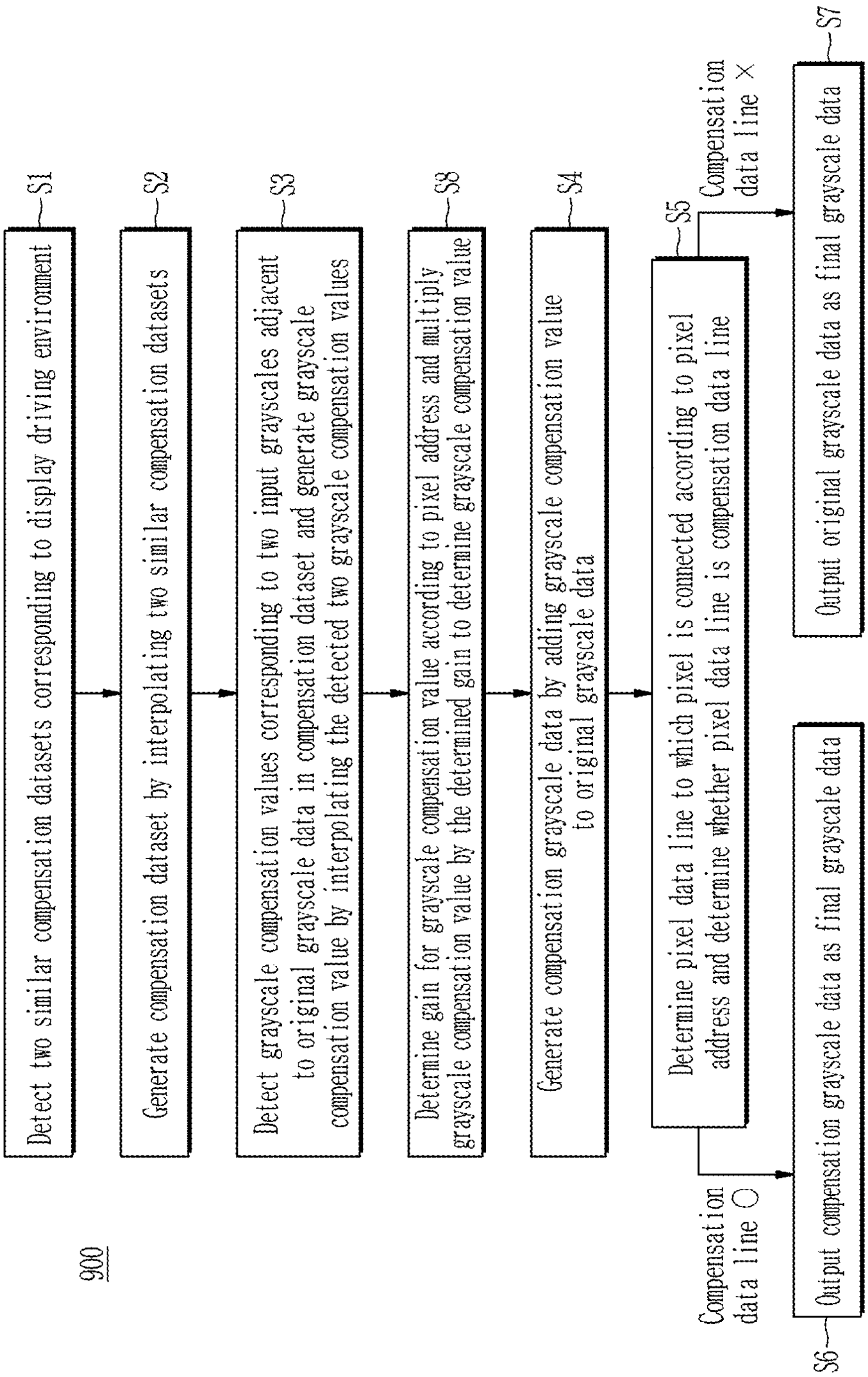
FIG. 9 is a flowchart of a method of operation of the compensation circuit, according to some example embodiments.

FIG. 9 is a flowchart of a method 900 of operation of the compensation circuit, according to some example embodiments. It is understood that additional operations can be provided before, during, and after the operations in FIG. 9, and some of the operations described below can be replaced or eliminated, for additional embodiments of the method. The order of the operations/processes may be interchangeable, or two or more operations can be performed simultaneously. The method 900 may be similar in some respects to the method 700 of FIG. 7, and therefore may be best understood with reference thereto where like numerals indicate like elements not described again in detail.

In the flowchart shown in FIG. 9, operations S1-S7 are similar to the operations S1-S7 shown in FIG. 7. However, a new operation S8 may be performed between the operations S3 and S4.

In operation S8, the compensator 232 may determine a gain for the grayscale compensation value (GCV) according to the pixel address PAD, and may multiply the grayscale compensation value (GCV) by the determined gain to determine a grayscale compensation value (GCF). The gain for the grayscale compensation value (GCV) may be a ratio that applies the grayscale compensation value (GCV), and the gain that determines a degree of compensation may vary depending on a position of the pixel. For example, as the position of the pixel in the display panel 150 is closer to a center thereof, the gain may increase.

Figure 10:
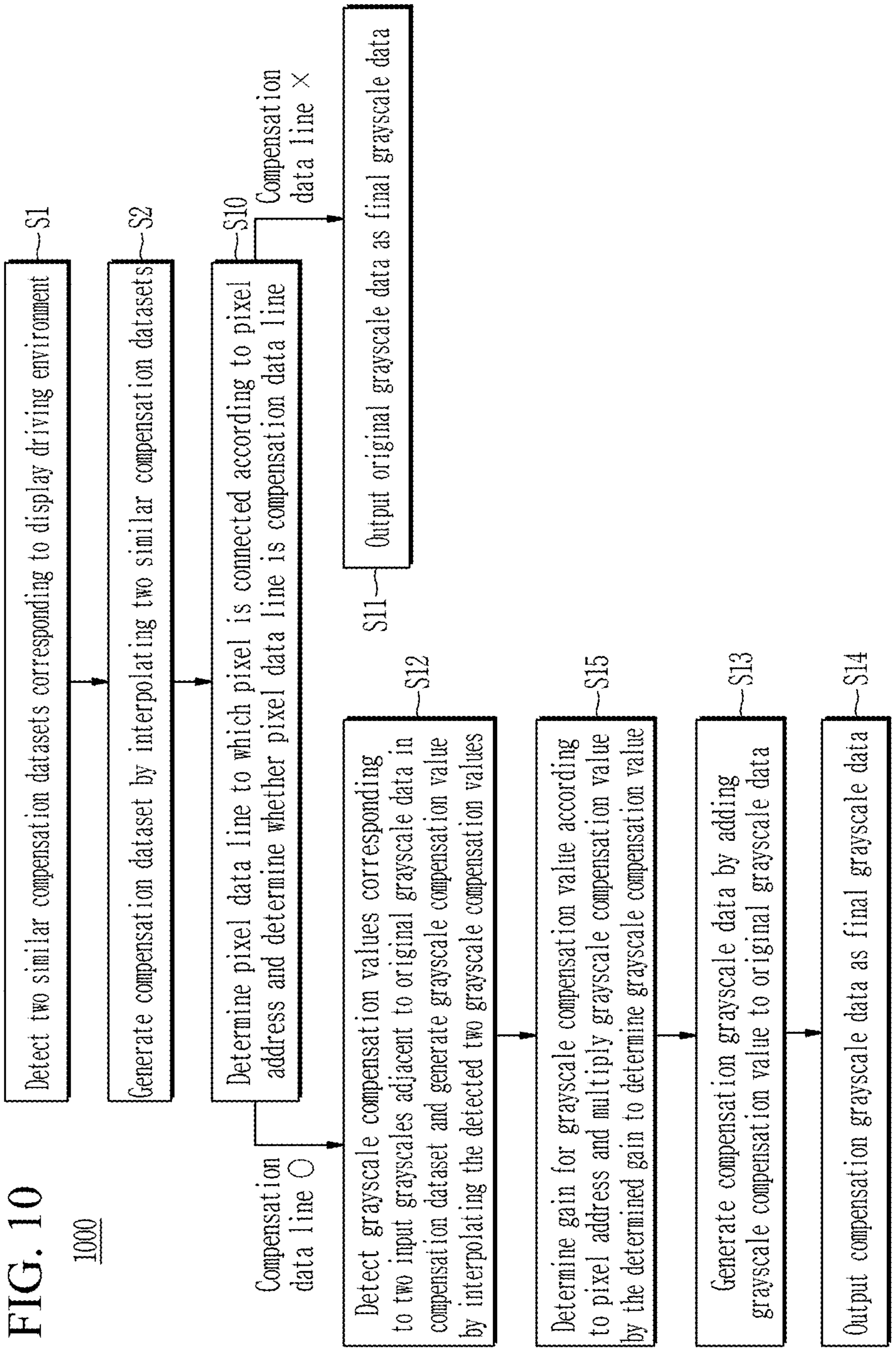
FIG. 10 is a flowchart of a method of operation of the compensation circuit, according to some example embodiments.

FIG. 10 is a flowchart of a method 1000 of operation of the compensation circuit, according to example embodiments. It is understood that additional operations can be provided before, during, and after the operations in FIG. 10, and some of the operations described below can be replaced or eliminated, for additional embodiments of the method. The order of the operations/processes may be interchangeable, or two or more operations can be performed simultaneously. The method 1000 may be similar in some respects to the method 800 of FIG. 8, and therefore may be best understood with reference thereto where like numerals indicate like elements not described again in detail.

In the flowchart shown in FIG. 10, operationsS10-S14 are similar to the operationsS10-S14 shown in FIG. 8. However, a new operation S15 may be performed between the operationsS12 and S13.

In operation S15, the compensator 232 may determine a gain for the grayscale compensation value (GCV) according to the pixel address PAD, and may multiply the grayscale compensation value (GCV) by the determined gain to determine a grayscale compensation value (GCF).

FIGS. 11(*a*), 11(*b*), and 11(*c*) illustrate methods for generating the final grayscale data according to some example embodiments of FIG. 7 and/or FIG. 9. The discussion below of FIGS. 11(*a*), 11(*b*), and 11(*c*) may be understood with reference to FIGS. 4 and 5.

FIG. 11(*a*) illustrates original grayscale data corresponding to four data lines DL_1-DL_4 and four gate lines GL1-GL4. Referring to FIG. 11(*a*), the original grayscale data are shown to indicate a "128" grayscale for convenience of description.

FIG. 11(*b*) illustrates grayscale compensation values (GCV) according to a color and a grayscale in the driving environment of the display device 12. In FIG. 11(*b*), the grayscale compensation value (GCV) for the red pixel indicates a "2" grayscale, the grayscale compensation value (GCV) for the blue pixel indicates a "1" grayscale, and the grayscale compensation value (GCV) for the green pixel indicates a "5" grayscale.

Because two data lines DL_1 and DL_2 are compensation data lines and two data lines DL_3 and DL_4 are not compensation data lines, as shown in FIG. 11(*c*), the final grayscale data are generated by adding the grayscale compensation values (GCV) to the original grayscale data for the two data lines DL_1 and DL_2, and the original grayscale data for the two data lines DL_3 and DL_4 are generated as the final grayscale data.

FIGS. 12(*a*), 12(*b*), and 12(*c*) illustrate methods for generating the final grayscale data according to some example embodiments of FIG. 8 and/or FIG. 10. The discussion below of FIGS. 12(*a*), 12(*b*), and 12(*c*) may be understood with reference to FIGS. 4 and 5.

FIG. 12(*a*) illustrates original grayscale data corresponding to four data lines DL_1-DL_4 and four gate lines GL1-GL4. In FIG. 12(*a*), the original grayscale data are shown to indicate a "128" grayscale for convenience of description.

FIG. 12(*b*) illustrates grayscale compensation values (GCV) according to a color and a grayscale in the driving environment of the display device 12. Because two data lines DL_1 and DL_2 are compensation data lines and two data lines DL_3 and DL_4 are not compensation data lines, in FIG. 12(*b*), the grayscale compensation value (GCV) for the red pixel of each of the two data lines DL_1 and DL_2 indicates a "2" grayscale, the grayscale compensation value (GCV) for the blue pixel thereof indicates a "1" grayscale, and the grayscale compensation value (GCV) for the green pixel thereof indicates a "5" grayscale. The grayscale compensation value (GCV) is not generated for the two data lines DL_3 and DL_4.

As shown in FIG. 12(*c*), the final grayscale data are generated by adding the grayscale compensation values (GCV) to the original grayscale data for the two data lines DL_1 and DL_2, and the original grayscale data for the two data lines DL_3 and DL_4 are generated as the final grayscale data.

A connection relationship between the source multiplexing circuit 136 of the source driver 130 and the plurality of data lines DL_1-DL_m according to some example embodiments may be different from the structure shown in FIG. 4. An artifact pattern such as a vertical line that occurs may vary depending on a method in which the plurality of amplifiers (135_1, 135_2, . . . ) are connected to the plurality of data lines DL_1-DL_m through the source multiplexing circuit 136.

Figure 13:
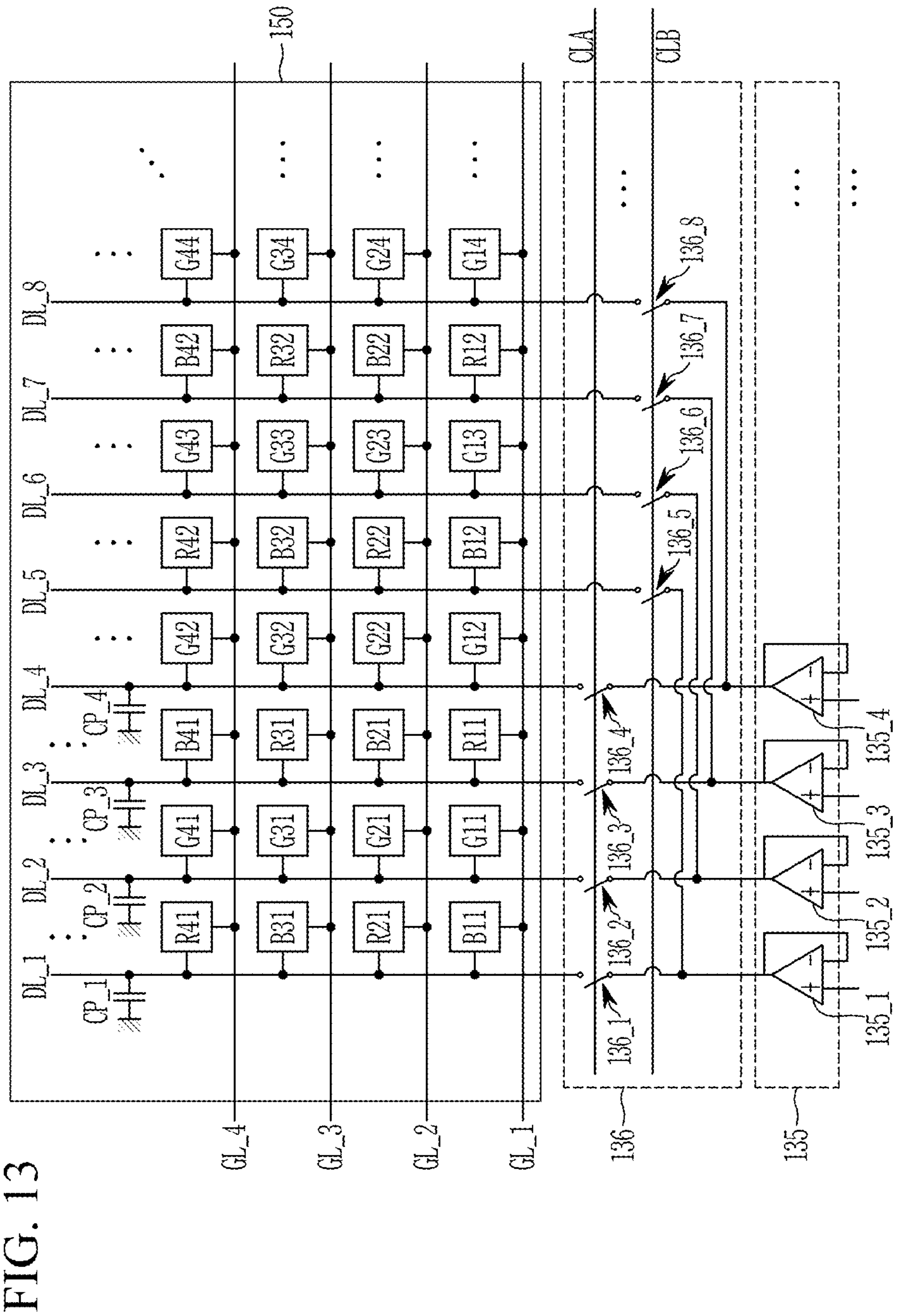
FIG. 13 illustrates another configuration of the source driver and the display panel, according to some example embodiments.

FIG. 13 illustrates another configuration of the source driver and the display panel, according to some example embodiments. The configuration in FIG. 13 may be similar in some respects to the configuration in FIG. 4, and therefore may be best understood with reference thereto where like numerals indicate like elements not described again in detail. For the sake of clarity of illustration, the driving control circuit 131, the shift register 132, the level shifter 133, and the decoder 134 shown in FIG. 4 are omitted in FIG. 13.

FIG. 13 illustrates eight data lines DL_1, DL_2, DL_3, DL_4, DL_5, DL_6, DL_7, and DL_8, four amplifiers 135_1, 135_2, 135_3, and 135_4, and a portion of the source multiplexing circuit 136.

According to the multiplexing driving method, the source driver 130 may supply the plurality of data signals to a plurality of first data lines (e.g., DL_1, DL_2, DL_3, and DL_4) among the plurality of data lines DL_1, DL_2, DL_3, DL_4, DL_5, DL_6, DL_7, and DL_8 during a first time period of one horizontal period and may supply a plurality of second data signals to a plurality of second data signals (e.g., DL_5, DL_6, DL_7, and DL_8) among the plurality of data lines DL_1, DL_2, DL_3, DL_4, DL_5, DL_6, DL_7, and DL_8 during a second time period of one horizontal period. As shown in FIG. 13, a voltage charged in each of a plurality of parasitic capacitors CP_1, CP_2, CP_3, and CP_4 connected to each of the plurality of first data lines DL_1, DL_2, DL_3, and DL_4 may be written in the pixel corresponding to the voltage charged in each of the plurality of parasitic capacitors. A parasitic capacitor is also formed in each of the plurality of second data lines DL_5, DL_6, DL_7, and DL_8, but, for the sake of discussion, the parasitic capacitor of each of the plurality of second data lines DL_5, DL_6, DL_7, and DL_8 is not considered to be involved in writing of the data signal in the pixel and so the parasitic capacitor of each of the plurality of second data lines is omitted in FIG. 13.

A plurality of red pixels R21 and R41 and a plurality of blue pixels B11 and B31 are alternately connected to the first data line DL_1 among the plurality of first data lines DL_1, DL_2, DL_3, and DL_4, and a plurality of blue pixels B12 and B32 and a plurality of red pixels R22 and R42 are alternately connected to the second data line DL_5 among the plurality of second data lines DL_5, DL_6, DL_7, and DL_8. A plurality of green pixels G11, G21, G31, and G41 are connected to the first data line DL_2 among the plurality of first data lines DL_1, DL_2, DL_3, and DL_4, and a plurality of green pixels G13, G23, G33, and G43 are connected to the second data line DL_6 among the plurality of second data lines DL_5, DL_6, DL_7, and DL_8. A plurality of red pixels R11 and R31 and a plurality of blue pixels B21 and B41 are alternately connected to the first data line DL_3 among the plurality of first data lines DL_1, DL_2, DL_3, and DL_4, and a plurality of blue pixels B22 and B42 and a plurality of red pixels R12 and R32 are alternately connected to the second data line DL_7 among the plurality of second data lines DL_5, DL_6, DL_7, and DL_8. The plurality of green pixels G12, G22, G32, and G42 are connected to the first data line DL_4 among the plurality of first data lines DL_1, DL_2, DL_3, and DL_4, and a plurality of green pixels G14, G24, G34, and G44 are connected to the second data line DL_8 among the plurality of second data lines DL_5, DL_6, DL_7, and DL_8. As described above, the red (R) pixel, the green (G) pixel, and the blue (B) pixel may be arranged in a pattern in which pixel columns with eight data line units are repeated. As is understood, the pattern of the pixels shown in FIG. 13 is merely example, and example embodiments are not limited thereto.

Each of the plurality of amplifiers 135_1, 135_2, 135_3, and 135_4 may receive each of the plurality of data signals from the decoder 134 (FIG. 3), and may output each of the plurality of data signals. In some example embodiments, each of the plurality of amplifiers 135_1, 135_2, 135_3, and 135_4 may be implemented as an operational amplifier. An output end of the operational amplifier may be connected to a negative input terminal (−) thereof, a positive input terminal (+) of the operational amplifier may be connected to the decoder 134, and the data signal may be input to the positive input terminal (+).

The source multiplexing circuit 136 may include a plurality of switching elements 136_1, 136_2, 136_3, 136_4, 136_5, 136_6, 136_7, and 136_8 connected between the plurality of amplifiers 135_1-135_4 and the plurality of data lines DL_1-DL_8. The plurality of switching elements 136_1, 136_2, 136_3, 136_4, 136_5, 136_6, 136_7, and 136_8 may perform a switching operation according to one of the multiplexing signals CLA and CLB received from the driving control circuit 131 (FIG. 3). For example, the plurality of switching elements 136_1, 136_2, 136_3, and 136_4 may perform a switching operation according to the multiplexing signal CLA, and the plurality of switching elements 136_5, 136_6, 135_7, and 135_8 may perform a switching operation according to the multiplexing signal CLB. The plurality of switching elements 136_1, 136_2, 136_3, and 136_4 may be turned ON during a first time period TP1, TP3, TP5, or TP7 (FIG. 5) in which the multiplexing signal CLA is at an ON level, and the plurality of switching elements 136_5, 136_6, 135_7, and 135_8 may be turned ON during a second time period TP2, TP4, TP6, or TP8 (FIG. 5) in which the multiplexing signal CLB is at an ON level.

One end of the switching element 136_1 may be connected to the data line DL_1, and the other end of the switching element 136_1 may be connected to an output end of the amplifier 135_1. One end of the switching element 136_2 may be connected to the data line DL_2, and the other end of the switching element 136_2 may be connected to an output end of the amplifier 135_2. One end of the switching element 136_3 may be connected to the data line DL_3, and the other end of the switching element 136_3 may be connected to an output end of the amplifier 135_3. One end of the switching element 136_4 may be connected to the data line DL_4, and the other end of the switching element 136_4 may be connected to an output end of the amplifier 135_4. One end of the switching element 136_5 may be connected to the data line DL_5, and the other end of the switching element 136_5 may be connected to the output end of the amplifier 135_1. One end of the switching element 136_6 may be connected to the data line DL_6, and the other end of the switching element 136_6 may be connected to the output terminal of the amplifier 135_2. One end of the switching element 136_7 may be connected to the data line DL_7, and the other end of the switching element 136_7 may be connected to an output terminal of the amplifier 135_7. One end of the switching element 136_8 may be connected to the data line DL_8, and the other end of the switching element 136_8 may be connected to an output terminal of the amplifier 135_8.

FIGS. 14(*a*), 14(*b*), and 14(*c*) illustrate methods for generating the final grayscale data according to some example embodiments of FIG. 7, FIG. 9, and/or FIG. 13, and may be understood with reference thereto.

FIG. 14(*a*) illustrates original grayscale data corresponding to eight data lines DL_1-DL_8 and gate lines GL1-GL4. In FIG. 14(*a*), the original grayscale data are shown to indicate a "128" grayscale for sake of description.

FIG. 14(*b*) illustrates grayscale compensation values (GCV) according to a color and a grayscale in the driving environment of the display device 12. In FIG. 14(*b*), the grayscale compensation value (GCV) for the red pixel indicates a "2" grayscale, the grayscale compensation value (GCV) for the blue pixel indicates a "1" grayscale, and the grayscale compensation value (GCV) for the green pixel indicates a "5" grayscale.

Because only four data lines DL_1, DL_2, DL_3, and DL_4 are compensation data lines and four data lines DL_5, DL_6, DL_7, and DL_8 are not compensation data lines, as shown in FIG. 14(*c*), the final grayscale data are generated by adding the grayscale compensation values (GCV) to the original grayscale data for the four data lines DL_1, DL_2, DL_3, and DL_4, and the original grayscale data for the four data lines DL_5, DL_6, DL_7, and DL_8 are generated as the final grayscale data.

FIGS. 15(*a*), 15(*b*), and 15(*c*) illustrate methods for generating the final grayscale data, according to some example embodiments of FIG. 8, FIG. 10, and/or FIG. 13, and may be understood with reference thereto.

FIG. 15(*a*) illustrates original grayscale data corresponding to eight data lines DL_1-DL_8 and gate lines GL1-GL4. In FIG. 15(*a*), the original grayscale data are shown to indicate a "128" grayscale for sake of description.

FIG. 15(*b*) illustrates grayscale compensation values (GCV) according to a color and a grayscale in the driving environment of the display device 12. Because only four data lines DL_1, DL_2, DL_3, and DL_4 are compensation data lines and four data lines DL_5, DL_6, DL_7, and DL_8 are not compensation data lines, in FIG. 15(*b*), the grayscale compensation value (GCV) for the red pixel of each of the four data lines DL_1, DL_2, DL_3, and DL_4 indicates a "2" grayscale, the grayscale compensation value (GCV) for the blue pixel thereof indicates a "1" grayscale, and the grayscale compensation value (GCV) for the green pixel thereof indicates a "5" grayscale. The grayscale compensation value (GCV) is not generated for the four data lines DL_5, DL_6, DL_7, and DL_8.

As shown in FIG. 15(*c*), the final grayscale data are generated by adding the grayscale compensation values (GCV) to the original grayscale data for the four data lines DL_1, DL_2, DL_3, and DL_4, and the original grayscale data for the four data lines DL_5, DL_6, DL_7, and DL_8 are generated as the final grayscale data.

Figure 16:
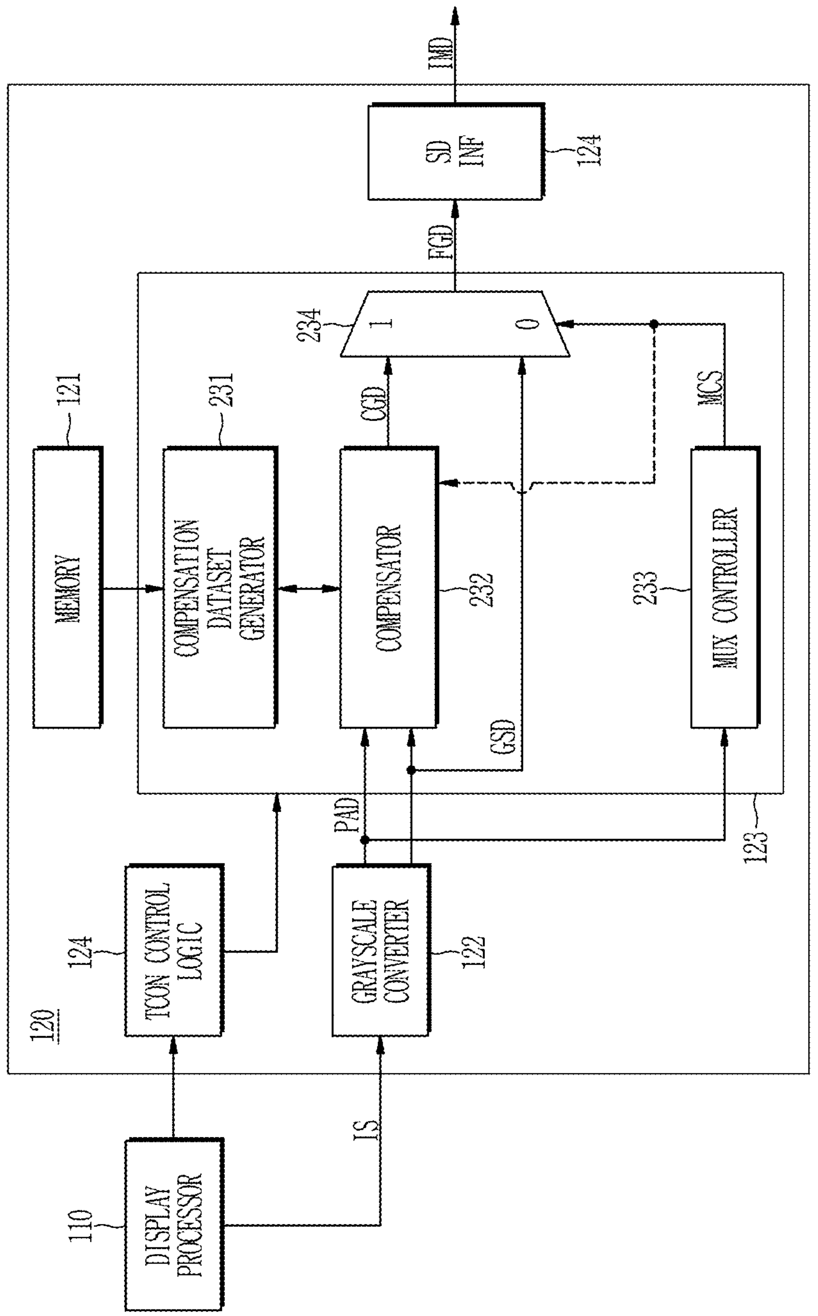
FIG. 16 illustrates a configuration of the timing controller, according to some example embodiments.

FIG. 16 illustrates a configuration of the timing controller 120, according to some example embodiments. The timing controller 120 of FIG. 16 may be similar in some respects to the timing controller 120 of FIG. 6, and therefore may be best understood with reference thereto where like numerals indicate like elements not described again in detail.

The timing controller 120 of FIG. 16 may include a control logic (TCON CONTROL LOGIC) 124. The control logic 124 may control the compensation circuit 123 according to a control command provided from the display processor 110. For example, the control logic 124 may turn ON or OFF a compensation operation of the compensation circuit 123 according to the control command. If the compensation circuit 123 is turned OFF by the control logic 124, the compensation circuit 123 may output the input grayscale data GSD as the final grayscale data FGD. If the compensation circuit 123 is turned ON by the control logic 124, as in the example embodiments described above, the compensation circuit 123 may determine whether it performs the compensation according to the pixel address, may generate the compensation grayscale data, and may generate the final grayscale data by adding a grayscale compensation value to the original grayscale data.

Additionally, the control logic 124 may adjust various parameters involved in an operation of the compensation circuit 123 according to the control command provided from the display processor 110. For example, the parameters applied to an interpolation method in which the compensation dataset generator 231 generates the interpolation compensation dataset may be adjusted by the control logic 124. The parameters applied to an interpolation method in which the compensator 232 generates the grayscale compensation value and the gain for the grayscale compensation value may be adjusted by the control logic 124.

In a display device using a multiplexing driving method, a luminance deviation for each data line may occur due to a deviation in a charge rate of the pixel for each data line. Example embodiments disclosed herein may reduce, minimize, or alleviate the luminance deviation for each data line that may occur in the multiplexing driving method through compensation of the grayscale data using existing circuit configuration and based on the display driving environment. Additionally, example embodiments may determine the compensation data line by considering a multiplexing structure (that is, a connection relationship between the plurality of amplifiers and the plurality of data lines). Accordingly, example embodiments may be applied to different multiplexing structures.

Any of the elements and/or functional blocks disclosed above may include or be implemented in processing circuitry such as hardware including logic circuits; a hardware/ software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A display device comprising:

a plurality of gate lines and a plurality of data lines;

a plurality of first pixels, each first pixel being connected to a first data line of the plurality of data lines and the plurality of gate lines; a plurality of second pixels, each second pixel being connected to a second data line of the plurality of data lines and the plurality of gate lines;

a source driver configured to provide a first data signal based on first compensation grayscale data to the first data line during a first time period in a horizontal period and provide a second data signal based on second original grayscale data to the second data line during a second time period in the horizontal period; and a timing controller configured to:

generate the first compensation grayscale data by compensating for a first original grayscale data corresponding to an input grayscale for each of the plurality of first pixels based on the input grayscale and a color of each of the first pixels, multiplex the first compensation grayscale data for each of the plurality of first pixels and the second original grayscale data for each of the plurality of second pixels, and provide the multiplexed first compensation grayscale data and the second original grayscale data to the source driver, wherein the first data line is configured to be charged by the first data signal provided to the first data line during the first time period, and the first data signal is configured to be written in one or more of the plurality of first pixels connected to the first data line during the second time period.

2. The display device of claim 1, further comprising a gate driver configured to supply a plurality of gate signals to the plurality of gate lines, wherein an ON-level time period of a gate signal of the plurality of gate signals does not overlap the first time period and overlaps the second time period.

3. The display device of claim 1, wherein the source driver comprises:

an amplifier configured to output the first data signal during the first time period and outputs the second data signal during the second time period;

a first switch element connected between an output terminal of the amplifier and the first data line and configured to be turned ON during the first time period; and a second switch element connected between the output terminal of the amplifier and the second data line and configured to be turned ON during the second time period.

4. The display device of claim 1, wherein the timing controller comprises:

a compensation dataset generator configured to generate a compensation dataset including one or more grayscale compensation values for each color and grayscale based on a driving environment of the display device; and a compensator configured to generate a first grayscale compensation value corresponding to the color of each of the first pixels and the input grayscale using the compensation dataset and configured to compensate for the first original grayscale data by using the first grayscale compensation value to generate the first compensation grayscale data.

5. The display device of claim 4, wherein the compensation dataset generator is configured to detect two similar compensation datasets corresponding to two driving environments similar to the driving environment of the display device among a plurality of compensation datasets, and is configured to interpolate the two similar compensation datasets to generate the compensation dataset, and each of the plurality of compensation datasets includes the one or more grayscale compensation values for each color and grayscale of a corresponding driving environment of the display device.

6. The display device of claim 4, wherein the compensator is configured to detect grayscale compensation values corresponding to two input grayscales adjacent to the input grayscale in the compensation dataset, is configured to interpolate the detected two grayscale compensation values to generate a grayscale compensation value, and is configured to add the grayscale compensation value to the first original grayscale data to generate the first compensation grayscale data.

7. The display device of claim 4, wherein the compensator is configured to detect grayscale compensation values corresponding to two input grayscales adjacent to the input grayscale in the compensation dataset, interpolates the detected two grayscale compensation values to generate a grayscale compensation value, is configured to determine a gain according to an address of each of the first pixels, is configured to multiply the grayscale compensation value by the determined gain to determine a grayscale compensation value, and is configured to generate the first compensation grayscale data by adding the grayscale compensation value to the first original grayscale data.

8. The display device of claim 4, wherein the timing controller further comprises a multiplexer configured to receive the first original grayscale data and the first compensation grayscale data and configured to output the first compensation grayscale data.

9. The display device of claim 1, wherein the timing controller is configured to compensate for the second original grayscale data based on an input grayscale for each of the plurality of second pixels and a color of each of the second pixels to generate second compensation grayscale data, and wherein the timing controller comprises:

a multiplexer configured to output the first compensation grayscale data on receiving the first original grayscale data and the first compensation grayscale data and configured to output the second original grayscale data on receiving the second original grayscale data and the second compensation grayscale data.

10. The display device of claim 1, wherein at least one color constituting a color pattern of the plurality of first pixels is same as at least one color constituting a color pattern of the plurality of second pixels.

11. A display device comprising:

a first data line and a second data line;

a plurality of first pixels connected to the first data line;

a plurality of second pixels connected to the second data line;

a source driver configured to multiplex and output a first data signal to the first data line during a first time period of each horizontal period and a second data signal to the second data line during a second time period of each horizontal period; and a timing controller configured to:

generate a compensation dataset according to a driving environment of the display device, generate first compensation grayscale data by compensating for first original grayscale data corresponding to an input grayscale for each of the plurality of first pixels by using a grayscale compensation value based on the input grayscale and a color of each of the first pixels in the compensation dataset, and provide the first compensation grayscale data to the source driver, wherein the first data signal is provided to the first data line, wherein the first data line is configured to be charged by the first data signal provided to the first data line during the first time period, and the first data signal is configured to be written in one or more of the plurality of first pixels connected to the first data line during the second time period.

12. The display device of claim 11, wherein the timing controller comprises:

a compensation dataset generator configured to generate the compensation dataset including one or more grayscale compensation values for each color and grayscale based on the driving environment of the display device; and a compensator configured to generate a first grayscale compensation value corresponding to the color and the input grayscale of each of the first pixels using the compensation dataset and configured to compensate for the first original grayscale data using the first grayscale compensation value to generate the first compensation grayscale data.

13. The display device of claim 12, wherein the compensation dataset generator is configured to detect two similar compensation datasets corresponding to two driving environments similar to the driving environment of the display device among a plurality of compensation datasets and is configured to interpolate the two similar compensation datasets to generate the compensation dataset, and each of the plurality of compensation datasets includes the grayscale compensation value for each color and grayscale of the driving environment of the display device.

14. The display device of claim 12, wherein the compensator is configured to detect grayscale compensation values corresponding to two input grayscales adjacent to the input grayscale in the compensation dataset, is configured to interpolate the detected two grayscale compensation values to generate a grayscale compensation value, and is configured to add the grayscale compensation value to the first original grayscale data to generate the first compensation grayscale data.

15. The display device of claim 12, wherein the compensator is configured to detect grayscale compensation values corresponding to two input grayscales adjacent to the input grayscale in the compensation dataset, is configured to interpolate the detected two grayscale compensation values to generate a grayscale compensation value, is configured to determine a gain according to an address of each of the first pixels, is configured to multiply the grayscale compensation value by the determined gain to determine a grayscale compensation value, and is configured to generate the first compensation grayscale data by adding the grayscale compensation value to the first original grayscale data.

16. A multiplexing driving method of a display device including a plurality of first pixels connected to a first data line and a plurality of second pixels connected to a second data line, the method comprising:

generating a compensation dataset corresponding to a driving environment of the display device among a plurality of compensation datasets;

detecting grayscale compensation values corresponding to two input grayscales adjacent to first original grayscale data of one of the plurality of first pixels in the compensation dataset and interpolating the two detected grayscale compensation values to generate first grayscale compensation value;

generating first compensation grayscale data using the first original grayscale data and the first grayscale compensation value;

supplying a first data signal according to the first compensation grayscale data to the first data line to charge the first data line during a first time period;

supplying a second data signal according to second original grayscale data of one of the plurality of second pixels to the second data line during a second time period; and writing the first data signal charged in one or more of the plurality of first pixels connected to the first data line during the second time period.

17. The multiplexing driving method of claim 16, wherein the generating of the compensation dataset comprises generating the compensation dataset by interpolating two similar compensation datasets corresponding to the driving environment of the display device.

18. The multiplexing driving method of claim 16, further comprising:

charging a parasitic capacitor of the first data line by the first data signal; and writing the second data signal in the one of the plurality of second pixels.

19. The multiplexing driving method of claim 16, wherein the supplying of the first data signal according to the first compensation grayscale data to the first data line comprises:

outputting the first compensation grayscale data among the first compensation grayscale data and the first original grayscale data based on an address of the one of the plurality of first pixels; and generating the first data signal according to the first compensation grayscale data.

20. The multiplexing driving method of claim 16, wherein the supplying of the second data signal according to the second original grayscale data of the one of the plurality of second pixels to the second data line comprises:

detecting grayscale compensation values corresponding to two input grayscales adjacent to the second original grayscale data in the compensation dataset and interpolating the two detected grayscale compensation values to generate a second grayscale compensation value;

generating second compensation grayscale data using the second original grayscale data and the second grayscale compensation value;

outputting the second original grayscale data among the second compensation grayscale data and the second original grayscale data based on an address of the one of the plurality of second pixels; and generating the second data signal according to the second original grayscale data.

* * * * *